(12) United States Patent
Tech et al.

(10) Patent No.: US 10,334,274 B2
(45) Date of Patent: Jun. 25, 2019

(54) MULTI-VIEW VIDEO CODEC SUPPORTING RESIDUAL PREDICTION

(71) Applicant: Fraunhofer-Gesellschaft zur Foerderung der angewandten Forschung e.V., Munich (DE)

(72) Inventors: Gerhard Tech, Berlin (DE); Karsten Suehring, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 132 days.

(21) Appl. No.: 15/668,996

(22) Filed: Aug. 4, 2017

(65) Prior Publication Data

US 2018/0063550 A1 Mar. 1, 2018

Related U.S. Application Data

(63) Continuation of application No. PCT/EP2016/052428, filed on Feb. 4, 2016.

(30) Foreign Application Priority Data

Feb. 5, 2015 (EP) .................... 15153896

(51) Int. Cl.
*H04N 13/00* (2018.01)
*H04N 19/597* (2014.01)
(Continued)

(52) U.S. Cl.
CPC ......... *H04N 19/597* (2014.11); *H04N 19/103* (2014.11); *H04N 19/105* (2014.11);
(Continued)

(58) Field of Classification Search
CPC . H04L 12/40; H04L 12/40163; H04L 9/0819; H04L 2012/40273; H04L 2012/40215
See application file for complete search history.

(56) References Cited

U.S. PATENT DOCUMENTS

2013/0265388 A1* 10/2013 Zhang .................. H04N 19/597
348/43
2014/0161189 A1* 6/2014 Zhang .................. H04N 19/597
375/240.16
(Continued)

FOREIGN PATENT DOCUMENTS

WO 2014089445 A1 6/2014

OTHER PUBLICATIONS

Ikai, Tomohiro, "CE4-related: ARP reference picture selection and its availability check", JCT3V-F0105.
(Continued)

*Primary Examiner* — Howard D Brown, Jr.
(74) *Attorney, Agent, or Firm* — Perkins Coie LLP; Michael A. Glenn

(57) ABSTRACT

Multi-view video coding/decoding supporting residual prediction involving a reference picture of different view and timestamp compared to a currently coded/decoded picture is improved in terms of robustness and/or processing cost by avoiding checking any picture availability or non-availability in a decoded picture buffer.

35 Claims, 17 Drawing Sheets

(51) Int. Cl.
H04N 19/70 (2014.01)
H04N 19/61 (2014.01)
H04N 19/176 (2014.01)
H04N 19/103 (2014.01)
H04N 19/105 (2014.01)
H04N 19/42 (2014.01)
H04N 19/573 (2014.01)
H04N 19/65 (2014.01)

(52) U.S. Cl.
CPC .......... *H04N 19/176* (2014.11); *H04N 19/42* (2014.11); *H04N 19/573* (2014.11); *H04N 19/61* (2014.11); *H04N 19/65* (2014.11); *H04N 19/70* (2014.11)

(56) References Cited

U.S. PATENT DOCUMENTS

| | | | | |
|---|---|---|---|---|
| 2014/0253681 | A1* | 9/2014 | Zhang | H04N 19/597 348/43 |
| 2015/0195506 | A1* | 7/2015 | Lin | H04N 19/597 375/240.16 |
| 2016/0330472 | A1* | 11/2016 | Han | H04N 19/52 |

OTHER PUBLICATIONS

Lin, Jian-Liang et al., "3D-HEVC HLS: On ARP reference picture signaling", 7. JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-G0053, XP030131801, Jan. 4, 2014.

Lin, Jian-Liang et al., "3D-HEVC HLS: On ARP reference picture signaling", JCT3V-G0053.

Liu, Hongbin et al., "Restricted Inter-View Residual Prediction", 100. MPEG Meeting; Apr. 30, 2012-May 4, 2012; Geneva; (Motion Picture Expert Group or ISO/IEC JTC1/SC29/WG11), No. m24766, XP030053109, Apr. 27, 2012.

Tech, Gerhard et al., "3D-HEVC Draft Text 6", JCT3V-J1001.

Tech, Gerhard , "3D-HEVC Test Model 1", 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, No. JCT3V-A1005, XP030130183, Sep. 20, 2012.

Tech, Gerhard et al., "Proposed Hls Cleanup for 3D-HEVC", 11. JCT-3V Meeting; Feb. 12, 2015-Feb. 18, 2015; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-K0050, XP030132716, Feb. 5, 2015.

Wang, Ye-Kui et al., "AHG21: On DPB management", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/ , No. JCTVC-G314, XP030110298, Nov. 9, 2011.

Zhang, Li et al., "3D-CE4: Advanced residual prediction for multiview coding", JCT3V-00049.

Zhang, Li et al., "CE4: Advanced residual prediction for multiview coding", JCT3V-D0177.

* cited by examiner

| | Descriptor |
|---|---|
| cu_extension(x0, y0, log2CbSize) { | |
|   if(!skip_intra_flag[x0][y0]) | |
|     skip_intra_mode_idx[x0][y0] | ae(v) |
|   else { | |
|     if( !cu_skip_flag[x0][y0]) { | |
|       if(DbbpEnabledFlag && DispAvailFlag && log2CbSize>3 && <br>      (PartMode==PART_2NxN \|\| PartMode==PART_Nx2N)} | |
|         dbbp_flag[x0][y0] | ae(v) |
|       if((CuPredMode[x0][y0]==MODE_INTRA ? IntraDcOnlyWedgeEnabledFlag : <br>      InterDcOnlyEnabledFlag) && PartMode==PART_2Nx2N) | |
|         dc_only_flag[x0][y0] | ae(v) |
|     } | |
|     if(CuPredMode[x0][y0] !=MODE_INTRA && PartMode==PART_2Nx2N){ | |
|       if( IvResPredEnabledFlag && RpRefPicAvailFlag) | |
|         iv_res_pred_weight_idx[x0][y0] | ae(v) |
|       if(slice_ic_enabled_flag && icCuEnableFlag && <br>      iv_res_pred_weight_idx[x0][y0]==0) | |
|         illu_comp_flag[x0][y0] | ae(v) |
|     } | |
| } | | set acc. to 60

67 could be optionally, set by residual prediction switch

Fig. 9a

I.8.3.9 Derivation process for the target reference index for residual prediction This process is invoked when the current slice is a P or B slice.

Let currPic be the current picture.

The variables RpRefIdxL0 and RpRefIdxL1 are set equal to −1, and the variables RpRefPicAvailFlagL0 and RpRefPicAvailFlagL1 are set equal to 0.

The following applies for X in the range of 0 to 1, inclusive:

- When X is equal to 0 or the current slice is a B slice the following applies:
  - The variable pocDiff is set equal to $2^{15} - 1$.
  - For i in the range of 0 to num_ref_idx_lX_active_minus1, inclusive, the following applies:
    - The variable currPocDiff is set equal to Abs( PicOrderCnt( RefPicListX[ i ] ) − PicOrderCntVal ).
    - When currPocDiff is not equal to 0 and currPocDiff is less than pocDiff, the following applies:

pocDiff = currPocDiff       (I-52)

RpRefIdxLX = i       (I-53)

RpRefPicAvailFlagLX = 1       (I-54)

The variable RpRefPicAvailFlag is derived as specified in the following:

RpRefPicAvailFlag =
( RpRefPicAvailFlagL0 || RpRefPicAvailFlagL1 ) && DispAvailFlag       (I-55)

When RpRefPicAvailFlag is equal to 1, the following applies for X in the range of 0 to 1, inclusive:

Fig. 12a

- For refViewOrderIdx in the range of 0 to MaxLayersMinus1, inclusive, the following applies:
    - The variable RefRpRefAvailFlagLX[ refViewOrderIdx ] is set equal to 0.
- When X is equal to 0 or the current slice is a B slice the following applies:
    - For i in the range of 0 to NumActiveRefLayerPics – 1, inclusive, the following applies:
        - The variable refViewOrderIdx is set equal to ViewOrderIdx( RefPicLayerId[ i ] ).
        - <u>Let picV the picture in the current AU with nuh_layer_id equal to RefPicLayerId[ i ].</u>
        - When RpRefPicAvailFlagLX is equal to 1 and there is a picture picA in ~~the DPB~~ <u>one of the reference picture sets RefPicSetLtCurr, RefPicSetStCurrBefore, RefPicSetStCurrAfter of picV</u> with PicOrderCnt( picA ) equal to PicOrderCnt( RefPicListX[ RpRefIdxLX ] ), ViewIdx( picA ) equal to refViewOrderIdx, OtherDimsEqualFlag( currPic, picA, DIM_VIEW ) equal to 1~~, and marked as "used for reference"~~, RefRpRefAvailFlagLX[ refViewOrderIdx ] is set equal to 1.

When RpRefPicAvailFlag is equal to 1 and RefRpRefAvailFlagL0[ refViewOrderIdx ] is equal to 1 for any refViewOrderIdx in the range of 0 to MaxLayersMinus1, inclusive, it is a requirement of bitstream conformance that PicOrderCnt( RefPicList0[ RpRefIdxL0 ] ) shall be the same for all slices of a coded picture.

When RpRefPicAvailFlag is equal to 1 and RefRpRefAvailFlagL1[ refViewOrderIdx ] is equal to 1 for any refViewOrderIdx in the range of 0 to MaxLayersMinus1, inclusive, it is a requirement of bitstream conformance that PicOrderCnt( RefPicList1[ RpRefIdxL1 ] ) shall be the same for all slices of a coded picture.

Fig. 12b

I.7.3.6.1 General slice segment header syntax

| slice_segment_header( ) { | Descriptor |
|---|---|
| ... | |
|     inter_layer_pred_layer_idc[ i ] | u(v) |
|     } | |
|   } | |
|   if( IvResPredFlag ) | |
|     if( slice_type == P \|\| slice_type == B ) { | |
|       for( i = 0; i < NumActiveRefLayerPics; i++ ) { | |
|         ref_rp_ref_avail_flag_l0[ i ] | u(1) |
|         if( slice_type == B ) | |
|           ref_rp_ref_avail_flag_l1[ i ] | u(1) |
|       } | |
|   if( sample_adaptive_offset_enabled_flag ) { | |
|     slice_sao_luma_flag | u(1) |
|   byte_alignment( ) | |
| } | | ref_rp_ref_avail_flag_l0[ i ] equal to specifies that the picture picA with PicOrderCnt( picA ) equal to PicOrderCnt( RefPicListX[ RpRefIdxL0 ] ), ViewIdx( picA ) equal to ViewOrderIdx( RefPicLayerId[ i ] ), OtherDimsEqualFlag( currPic, picA, DIM_VIEW ) equal to 1 might not be present and is not used in the residual prediction decoding process of the current slice. ref_rp_ref_avail_flag_l0[ i ] equal to 1 specifies that the picture picA with PicOrderCnt( picA ) equal to PicOrderCnt( RefPicListX[ RpRefIdxL0 ] ), ViewIdx( picA ) equal to ViewOrderIdx( RefPicLayerId[ i ] ), OtherDimsEqualFlag( currPic, picA, DIM_VIEW ) equal to 1 is present and might be used for the residual prediction decoding process of the current slice.

ref_rp_ref_avail_flag_l1[ i ] equal to specifies that the picture picA with PicOrderCnt( picA ) equal to PicOrderCnt( RefPicListX[ RpRefIdxL1 ] ), ViewIdx( picA ) equal to ViewOrderIdx( RefPicLayerId[ i ] ), OtherDimsEqualFlag( currPic, picA, DIM_VIEW ) equal to 1 might not be present and is not used in the residual prediction decoding process of the current slice. ref_rp_ref_avail_flag_l1[ i ] equal to 1 specifies that the picture picA with PicOrderCnt( picA ) equal to PicOrderCnt( RefPicListX[ RpRefIdxL0 ] ), ViewIdx( picA ) equal to ViewOrderIdx( RefPicLayerId[ i ] ), OtherDimsEqualFlag( currPic, picA, DIM_VIEW ) equal to 1 is present and might be used for the residual prediction decoding process of the current slice.

Fig. 13

I.8.3.9 Derivation process for the target reference index for residual prediction This process is invoked when the current slice is a P or B slice.

Let currPic be the current picture.

The variables RpRefIdxL0 and RpRefIdxL1 are set equal to −1, and the variables RpRefPicAvailFlagL0 and RpRefPicAvailFlagL1 are set equal to 0.

The following applies for X in the range of 0 to 1, inclusive:
- When X is equal to 0 or the current slice is a B slice the following applies:
  - The variable pocDiff is set equal to $2^{15} - 1$.
  - For i in the range of 0 to num_ref_idx_lX_active_minus1, inclusive, the following applies:
    - The variable currPocDiff is set equal to Abs( PicOrderCnt( RefPicListX[ i ] ) − PicOrderCntVal ).
    - When currPocDiff is not equal to 0 and currPocDiff is less than pocDiff, the following applies:

pocDiff = currPocDiff     (I-52)

RpRefIdxLX = i     (I-53)

RpRefPicAvailFlagLX = 1     (I-54)

The variable RpRefPicAvailFlag is derived as specified in the following:

RpRefPicAvailFlag =
( RpRefPicAvailFlagL0 || RpRefPicAvailFlagL1 ) && DispAvailFlag     (I-55)

When RpRefPicAvailFlag is equal to 1, the following applies for X in the range of 0 to 1, inclusive:

Fig. 14a

- For refViewOrderIdx in the range of 0 to MaxLayersMinus1, inclusive, the following applies:
  - The variable RefRpRefAvailFlagLX[ refViewOrderIdx ] is set equal to 0.
- When X is equal to 0 or the current slice is a B slice the following applies:
  - For i in the range of 0 to NumActiveRefLayerPics − 1, inclusive, the following applies:
    - The variable refViewOrderIdx is set equal to ViewOrderIdx( RefPicLayerId[ i ] ).
    - <u>RefRpRefAvailFlagLX[ refViewOrderIdx ] is set equal to RpRefPicAvailFlagLX && ref_rp_ref_avail_flag_lX[ i ].</u>
    - <u>When RefRpRefAvailFlagLX[ refViewOrderIdx ] is equal to 1, it is a requirement of bitstream conformance, that there is a picture picA in the DPB with PicOrderCnt( picA ) equal to PicOrderCnt( RefPicListX[ RpRefIdxLX ] ), ViewIdx( picA ) equal to refViewOrderIdx, OtherDimsEqualFlag( currPic, picA, DIM_VIEW ) equal to 1, and marked as "used for reference".</u>
    - ~~When RpRefPicAvailFlagLX is equal to 1 and there is a picture picA in the DPB with PicOrderCnt( picA ) equal to PicOrderCnt( RefPicListX[ RpRefIdxLX ] ), ViewIdx( picA ) equal to refViewOrderIdx, OtherDimsEqualFlag( currPic, picA, DIM_VIEW ) equal to 1, and marked as "used for reference", RefRpRefAvailFlagLX[ refViewOrderIdx ] is set equal to 1.~~

When RpRefPicAvailFlag is equal to 1 and RefRpRefAvailFlagL0[ refViewOrderIdx ] is equal to 1 for any refViewOrderIdx in the range of 0 to MaxLayersMinus1, inclusive, it is a requirement of bitstream conformance that PicOrderCnt( RefPicList0[ RpRefIdxL0 ] ) shall be the same for all slices of a coded picture.

When RpRefPicAvailFlag is equal to 1 and RefRpRefAvailFlagL1[ refViewOrderIdx ] is equal to 1 for any refViewOrderIdx in the range of 0 to MaxLayersMinus1, inclusive, it is a requirement of bitstream conformance that PicOrderCnt( RefPicList1[ RpRefIdxL1 ] ) shall be the same for all slices of a coded picture.

Fig. 14b

MULTI-VIEW VIDEO CODEC SUPPORTING RESIDUAL PREDICTION

CROSS-REFERENCE TO RELATED APPLICATIONS

This application is a continuation of copending International Application No. PCT/EP2016/052428, filed Feb. 4, 2016, which is incorporated herein by reference in its entirety, and additionally claims priority from European Application No. EP 15 153 896.4, filed Feb. 5, 2015, which is incorporated herein by reference in its entirety.

The present application is concerned with multi-view video coding supporting residual prediction.

BACKGROUND OF THE INVENTION

An example for a multi-view video codec supporting residual prediction is 3D-HEVC. In the current design of 3D-HEVC [5], the coding unit (CU) decoding process for residual prediction ([1], [2]) refers to three reference pictures. The pictures can be identified by a reference picture order count (POC), a reference view order index (VOI), the current POC, and the current VOI.

The reference POC is the POC of a picture which is a) included in the reference picture list RefPicList of the current picture; and b) included in the current layer. The reference POC is derived from syntax elements of the VPS and the slice header of the current picture and is constant for all CUs of the current picture ([3], [4]).

The reference VOI is the VOI of a picture which is a) included in the reference picture list RefPicList of the current picture; and b) included in the current access unit (AU). It is derived from syntax elements of the VPS, the slice header, and the current CU and can thus vary for CUs of the current picture.

The three reference pictures referred by a CU are included in:
1. the current view and an AU with the reference POC (denoted as picture A)
2. the view with the reference VOI and the current AU (denoted as picture V)
3. the view with the reference VOI and the AU with the reference POC (denoted as picture VA)

When a reference POC and a reference VOI can be derived and all three reference pictures are available, residual prediction is enabled for the current CU.

The availability of picture V and picture A is implicitly guaranteed since:
  The reference POC and the reference VOI are selected among the POCs and VOIs, respectively, of pictures included in the reference picture list (RefPicList) of the current picture.
  RefPicList includes a subset of pictures included in the union of picture sets RefPicSetLtCurr, RefPicSetStCurrBefore, RefPicSetStCurrAfter, RefPicSetInterLayer1, and RefPicSetInterLayer0, which are derived from the slice header of the current picture and the VPS.
  Pictures included in RefPicSetLtCurr, RefPicSetStCurrBefore, RefPicSetStCurrAfter, RefPicSetInterLayer1, and RefPicSetInterLayer0 have (by a bitstream constraint) to be in the decoded picture buffer (DPB), when decoding the current picture.
Picture VA is available, when the decoded picture buffer (DPB) includes a picture which is marked as "used for reference" and has the reference POC and the reference VOI ([3]). Thus, whether the decoding process for residual prediction is invoked for a current CU depends on the state of the DPB.

Note that, although not explicitly tested in the decoding process, the picture VA is available when both of the following conditions are fulfilled:
  1) The bitstream contains a picture with reference POC and the reference VOI.
  2) The syntax elements of the picture V indicate that the picture VA might be used by as reference by one of the following:
    a) Picture V. This is indicated, when picture VA is included in one of the sets RefPicSetLtCurr, RefPicSetStCurrBefore, or RefPicSetStCurrAfter derived from the UPS and the slice header of picture V.
    b) Pictures following the V picture in the view with the reference VOI. This is indicated when picture VA, is included in RefPicSetLtFoll or RefPicSetStFoll derived from the VPS and the slice header of picture V.

Note that, without loss of generality the description above and in the following assumes, that the current CU and the current slice only performs P prediction. For B prediction the process
  might be performed for both lists of the CU.
  might only disable the use of a picture VA when not available, instead of disabling residual prediction entirely for the CU.

An Example 1 is shown in FIG. 1, which depicts layers of a 3D-HEVC multilayer bitstream and picture dependencies of CUs of a current picture. The current picture is picture 2 of view 3. The parameters sets VPS, SPS; pictures 0, 1 and 2 of views 0, 1, and 2; pictures 0 and 1 of view 3; and the slice header of the current picture are decoded before decoding any coding units (CUs) of the current picture.

Moreover, before decoding the first CU of the current picture the reference picture list refPicList is derived from syntax elements of the VPS and the slice header of the current picture. The list refPicList includes pictures 0 and 1 of view 3 and pictures 2 of views 0 and 2. The reference POC is selected among POCs of pictures included refPicList and view 3, such that it is equal to 1.

When CU 0 is decoded the reference VOI is derived from syntax elements of the VPS, the slice header of the current picture and CU 0, such that it is equal to 2. Hence, pictures V and A are picture 2 in view 2 and picture 1 in view 3, respectively. To determine whether residual prediction is enabled for the CU 0, it is furthermore tested if the picture 1 of view 2 (picture VA) is included in the DPB and "marked as used for reference". Since picture 1 of view 2 is present in the bitstream and included in RefPicSetStFoll of picture 2 of view 2 this is the case and residual prediction is enabled for CU 0.

When CU 1 is decoded the reference VOI is derived from syntax elements of the VPS, the slice header of the current picture and CU 1, such that it is equal to 0. Hence, pictures V and A are picture 2 in view 0 and picture 1 in view 3, respectively. To determine whether residual prediction is enabled for the CU 1, it is furthermore tested if picture 1 of view 0 (picture VA) is included in the DPB and "marked as used for reference". Since picture 1 of view 0 is present in the bitstream and included in RefPicSetLtCurr of picture 2 of view 2 this is the case and residual prediction is enabled for CU 1.

A problem of the current residual prediction decoding process is the dependency on the presence of a picture with the reference POC and VOI (picture VA) in the DPB. Such a dependency on the state of the DPB is in general avoided in HEVC specification by design choice. A drawback of the design is that a loss of picture VA is not necessarily detected when decoding the current picture.

Thus, when decoding a current CU and the picture VA is not present in the DPB, it is not clear whether it is lost or intentionally not present.

See Example 2 in FIG. 2. FIG. 2 depicts the same setup as in example 1, with the difference that picture 1 in view 2 has been lost. Thus, condition 1 (as provided above) is not fulfilled and picture VA for CU 0 is not in the DPB, such that residual prediction is disabled for CU 0. However, the erroneous decoding cannot be detected when decoding the current picture, since picture 1 in view 2 is not mandatory to be present. Note that, the presence of picture 1 of view 2 in RefPicSetStFoll or RefPicSetLtFoll of picture 2 in view 2 does not demand its presence in the bitstream or in the DPB. Reason for this design choice in HEVC is e.g., in a scenario without residual prediction at all, to be able to discard picture 1 of view 2 without changing picture 2 of view 2.

Accordingly, there is a need for a multi-view video codec with an improved support of residual prediction involving a picture neither coinciding in timestamp nor in view with a currently coded/decoded picture, such as improved with respect to robustness against transmission lost and/or respect to processing costs.

The object of the present invention is to provide such multi-view video codec with an improved support of residual prediction involving a picture neither coinciding in timestamp nor in view with a currently coded/decoded picture, such as improved with respect to robustness against transmission lost and/or respect to processing costs.

SUMMARY

According to an embodiment a multi-view decoder may have: a video decoding core configured to decode a plurality of views from a data stream, the video decoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and a residual prediction switch configured to read a parameter set from the data stream, the parameter set relating to the second reference picture, and derive therefrom the set of all reference pictures that can be used for prediction of the second reference picture and are of the reference view; check whether the third reference picture is included in the set of reference pictures; depending on the check, if the third reference picture is included in the set of reference pictures, enable the residual prediction for the predetermined motion- or disparity-compensatedly predicted coding unit at least with respect to third reference picture; and depending on the check, if the third reference picture is not included in the set of reference pictures, disable the residual prediction for the predetermined motion- or disparity-compensatedly predicted coding unit at least with respect to third reference picture, wherein the video decoding core is configured to, depending on the residual prediction switch, apply or not apply residual prediction based on the third reference picture for the predetermined motion- or disparity-compensatedly predicted coding unit.

Another embodiment may have a video encoding core configured to encode a plurality of views into a data stream, the video encoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and a residual prediction switch configured to insert a parameter set into the data stream which relates to the second reference picture and allows a derivation of a the set of all reference pictures that can be used for prediction of the second reference picture and are of the reference view; check whether the third reference picture is included in the set of reference pictures; depending on the check, if the third reference picture is included in the set of reference pictures, enable the residual prediction for the current predetermined motion- or disparity-compensatedly predicted coding unit at least with respect to third reference picture; and depending on the check, if the third reference picture is not included in the set of reference pictures, disable the residual prediction for the current predetermined motion- or disparity-compensatedly predicted coding unit at least with respect to third reference picture, wherein the video encoding core is configured to, depending on the residual prediction switch, apply or not apply residual prediction based on the third reference picture for the current predetermined motion- or disparity-compensatedly predicted coding unit.

According to another embodiment a method for multi-view video decoding may have the steps of: decoding, performed by a video decoding core, a plurality of views from a data stream, the video decoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, reading a parameter set from the data stream, the parameter set relating to the second reference picture, and deriving therefrom the set of all reference pictures that can be used for prediction of the second reference picture and are of the reference view; checking whether the third reference picture is included in the set of reference pictures; depending on the check, if the third reference picture is included in the set of reference pictures, enabling the residual prediction for the current coding unit at least with respect to third reference picture; and depending on the check, if the third reference picture is not included in the set of reference pictures, disabling the residual prediction for the current coding unit at least with respect to third reference picture, so that, depending on the check, the video decoding core applies or not applies disparity-compensated residual prediction based on the third reference picture for the current coding unit.

According to another embodiment a method for multi-view video encoding may have the steps of: encoding, performed by a video encoding core, a plurality of views into a data stream, the video encoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and inserting a parameter set into in the data stream which relates to the second reference picture and allows for a derivation of the set of all reference pictures that can be used for prediction of the second reference picture and are of the reference view; checking whether the third reference picture is included in the set of reference pictures; depending on the check, if the third reference picture is included in the set of reference pictures, enabling the residual prediction for the current coding unit at least with respect to third reference picture; and depending on the check, if the third reference picture is not included in the set of reference pictures, disabling the residual prediction for the current coding unit at least with respect to third reference picture, so that the video encoding core, depending on the disparity-compensated residual prediction switch, applies or not applies disparity-compensated residual prediction based on the third reference picture for the current coding unit.

Another embodiment may have a non-transitory digital storage medium having a computer program stored thereon to perform the method for multi-view decoding, comprising decoding, performed by a video decoding core, a plurality of views from a data stream, the video decoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, reading a parameter set from the data stream, the parameter set relating to the second reference picture, and deriving therefrom the set of all reference pictures that can be used for prediction of the second reference picture and are of the reference view; checking whether the third reference picture is comprised in the set of reference pictures; depending on the check, if the third reference picture is comprised in the set of reference pictures, enabling the residual prediction for the current coding unit at least with respect to third reference picture; and depending on the check, if the third reference picture is not comprised in the set of reference pictures, disabling the residual prediction for the current coding unit at least with respect to third reference picture, so that, depending on the check, the video decoding core applies or not applies disparity-compensated residual prediction based on the third reference picture for the current coding unit, when said computer program is run by a computer.

Another embodiment may have a non-transitory digital storage medium having a computer program stored thereon to perform the method for multi-view video encoding, comprising Encoding, performed by a video encoding core, a plurality of views into a data stream, the video encoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and inserting a parameter set into in the data stream which relates to the second reference picture and allows for a derivation of the set of all reference pictures that can be used for prediction of the second reference picture and are of the reference view; checking whether the third reference picture is comprised in the set of reference pictures; depending on the check, if the third reference picture is comprised in the set of reference pictures, enabling the residual prediction for the current coding unit at least with respect to third reference picture; and depending on the check, if the third reference picture is not comprised in the set of reference pictures, disabling the residual prediction for the current coding unit at least with respect to third reference picture, so that the video encoding core, depending on the disparity-compensated residual prediction switch, applies or not applies disparity-compensated residual prediction based on the third reference picture for the current coding unit, when said computer program is run by a computer.

Another embodiment may have a digital storage medium having stored thereon a data stream generated by a method for multi-view video encoding, comprising: encoding, performed by a video encoding core, a plurality of views into a data stream, the video encoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and inserting a parameter set into in the data stream which relates to the second reference picture and allows for a derivation of the set of all reference pictures that can be used for prediction of the second reference picture and are of the reference view; checking whether the third reference picture is comprised in the set of reference pictures; depending on the check, if the third reference picture is comprised in the set of reference pictures, enabling the residual prediction for the current coding unit at least with respect to third reference picture; and depending on the check, if the third reference picture is not comprised in the set of reference pictures, disabling the residual prediction for the current coding unit at least with respect to third reference picture, so that the video encoding core, depending on the disparity-compensated residual prediction switch, applies or not applies disparity-compensated residual prediction based on the third reference picture for the current coding unit.

According to another embodiment, a multi-view video decoder may have: a video decoding core configured to decode a plurality of views from a data stream, the video decoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, a residual prediction switch configured to read a first parameter set from the data stream, the first parameter set relating to the current picture, and derive therefrom a first set of reference pictures included in a view different from the current view and potentially serving as the second reference picture for coding units of the current picture and a reference timestamp of a reference picture which potentially serves as the first reference picture for coding units of the current picture; for each of a second set of reference pictures having one picture for each reference picture of the first set which coincides in view with the respective reference picture of the first set of reference pictures, and is of the reference timestamp, read a flag from a second parameter set within the data stream, relating to the current picture, the flag indicating whether the respective picture of the second set of reference pictures is available as third reference picture for residual prediction; wherein the video decoding core is configured to, depending on the flag related to a predetermined reference picture out of the second set of pictures, apply or not apply residual prediction for the predetermined motion or disparity-compensatedly predicted coding unit using the respective picture of the second set of pictures as the third reference picture.

According to another embodiment, a multi-view video encoder may have: a video decoding core configured to encode a plurality of views into a data stream, the video encoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, a residual prediction switch configured to insert, into a first parameter set incorporated by the data stream, a parameter set relating to the current picture based on which a first set of reference pictures included in a view different from the current view and potentially serving as the second reference picture for coding units of the current picture and a reference timestamp of a reference picture which potentially serves as the first reference picture for coding units of the current picture are derivable; for each of a second set of reference pictures having one picture for each reference picture of the first set which coincides in view with the respective reference picture of the first set of reference pictures, and is of the reference timestamp, insert a flag in a second parameter set into the data stream, relating to the current picture, the flag indicating whether the respective picture of the second set of reference pictures is available as third reference picture for residual prediction; wherein the video encoding core is configured to, depending on the availability of a predetermined reference picture out of the second set of pictures as indicated by the flags in the second parameter set, apply or not apply residual prediction for the predetermined motion or disparity-compensatedly predicted coding unit using the respective picture of the second set of pictures as the third reference picture.

According to another embodiment a method for multi-view video decoding may have the steps of: decoding, performed by a video decoding core, a plurality of views from a data stream, the video decoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, reading a first parameter set from the data stream, the parameter set relating to the current picture, and deriving therefrom a first set of reference pictures included in a view different from the current view and potentially serving as the second reference picture for coding units of the current picture and a reference timestamp of a reference picture which potentially serves as the first reference picture for coding units of the current picture; for each of a second set of reference pictures having one picture for each reference picture of the first set which coincides in view with the respective reference picture of the first set of reference pictures, and is of the reference timestamp, reading a flag from a second parameter set within the data stream, relating to the current picture, the flag indicating whether the respective picture of the second set of pictures is available as third picture for residual prediction; wherein the video decoding core, depending on the flag related to a predetermined reference picture out of the second set of pictures, applies or not applies residual prediction for the predetermined motion or disparity-compensatedly predicted coding unit using the respective picture of the second set of reference pictures as the third reference picture.

According to another embodiment a method for multi-view video encoding may have the steps of: encoding, performed by a video encoding core, a plurality of views into a data stream, the video encoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, inserting, into a first parameter set incorporated by the data stream, a parameter set relating to the current picture based on which a first set of reference pictures included in a view different from the current view and potentially serving as the second reference picture for coding units of the current picture and a reference timestamp of a reference picture which potentially serves as the first reference picture for coding units of the current picture is derivable; for each of a second set of reference pictures having one picture for each reference picture of the first set which coincides in view with the respective reference picture of the first set of reference pictures, and is of the reference timestamp, inserting a flag in a second parameter set into the data stream, relating to the current picture, the flag indicating whether the respective picture of the second set of pictures is available as third picture for residual prediction; wherein the video encoding core, depending on the availability of a predetermined reference picture out of the second set of pictures as indicated by the flags in the second parameter set, applies or not applies residual prediction for the predetermined motion or disparity-compensatedly predicted coding unit using the respective picture of the second set of reference pictures as the third reference picture.

Another embodiment may have a non-transitory digital storage medium having a computer program stored thereon to perform the method for multi-view video decoding, comprising: decoding, performed by a video decoding core, a plurality of views from a data stream, the video decoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, reading a first parameter set from the data stream, the parameter set relating to the current picture, and deriving therefrom a first set of reference pictures comprised in a view different from the current view and potentially serving as the second reference picture for coding units of the current picture and a reference timestamp of a reference picture which potentially serves as the first reference picture for coding units of the current picture; for each of a second set of reference pictures comprising one picture for each reference picture of the first set which coincides in view with the respective reference picture of the first set of reference pictures, and is of the reference timestamp, reading a flag from a second parameter set within the data stream, relating to the current picture, the flag indicating whether the respective picture of the second set of pictures is available as third picture for residual prediction; wherein the video decoding core, depending on the flag related to a predetermined reference picture out of the second set of pictures, applies or not applies residual prediction for the predetermined motion or disparity-compensatedly predicted coding unit using the respective picture of the second set of reference pictures as the third reference picture, when said computer program is run by a computer.

Another embodiment may have a non-transitory digital storage medium having a computer program stored thereon to perform the method for multi-view video encoding comprising: encoding, performed by a video encoding core, a plurality of views into a data stream, the video encoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, inserting, into a first parameter set comprised by the data stream, a parameter set relating to the current picture based on which a first set of reference pictures comprised in a view different from the current view and potentially serving as the second reference picture for coding units of the current picture and a reference timestamp of a reference picture which potentially serves as the first reference picture for coding units of the current picture is derivable; for each of a second set of reference pictures comprising one picture for each reference picture of the first set which coincides in view with the respective reference picture of the first set of reference pictures, and is of the reference timestamp, inserting a flag in a second parameter set into the data stream, relating to the current picture, the flag indicating whether the respective picture of the second set of pictures is available as third picture for residual prediction; wherein the video encoding core, depending on the availability of a predetermined reference picture out of the second set of pictures as indicated by the flags in the second parameter set, applies or not applies residual prediction for the predetermined motion or disparity-compensatedly predicted coding unit using the respective picture of the second set of reference pictures as the third reference picture, when said computer program is run by a computer.

Another embodiment may have a digital storage medium having stored thereon a data stream generated by a method for multi-view video encoding comprising: encoding, performed by a video encoding core, a plurality of views into a data stream, the video encoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, inserting, into a first parameter set comprised by the data stream, a parameter set relating to the current picture based on which a first set of reference pictures comprised in a view different from the current view and potentially serving as the second reference picture for coding units of the current picture and a reference timestamp of a reference picture which potentially serves as the first reference picture for coding units of the current picture is derivable; for each of a second set of reference pictures comprising one picture for each reference picture of the first set which coincides in view with the respective reference picture of the first set of reference pictures, and is of the reference timestamp, inserting a flag in a second parameter set into the data stream, relating to the current picture, the flag indicating whether the respective picture of the second set of pictures is available as third picture for residual prediction; wherein the video encoding core, depending on the availability of a predetermined reference picture out of the second set of pictures as indicated by the flags in the second parameter set, applies or not applies residual prediction for the predetermined motion or disparity-compensatedly predicted coding unit using the respective picture of the second set of reference pictures as the third reference picture.

In accordance with the present application, multi-view video coding/decoding supporting residual prediction involving a reference picture of different view and timestamp compared to a currently coded/decoded picture may be improved in terms of robustness and/or processing cost if checking any picture availability or non-availability in a decoded picture buffer is avoided. In accordance with a first aspect of the present invention, the enablement or disablement of the residual prediction for a predetermined motion- or disparity-compensatedly predicted coding unit is, at least with respect to a third reference picture different in view and timestamp compared to a current picture, performed dependent on an inspection of a parameter set in the data stream which relates to a second reference picture of the current picture which coincides in reference view with the third reference picture and coincides in timestamp with the current picture. From this parameter set, the set of all reference pictures is derived that can be used for prediction of the second reference picture and are of the reference view, i.e. the set of reference pictures that are available for intra-layer prediction of the second reference picture. By this measure, the decision on enablement/disablement of the residual prediction is no longer dependent on a presence or absence of the third reference picture in a decoded picture buffer, and accordingly a situation where the third reference picture is absent from the decoded picture buffer by accident due to transmission loss does not lead to an incorrect classification of coding units into ones to be subject to residual prediction and ones not to be subject to residual prediction. In accordance with another aspect of the present application, the decision on enablement/disablement of residual prediction of a predetermined motion- or disparity-compensatedly predicted coding unit is, at least with respect to the third reference picture, performed by flags in a second parameter set within the data stream relating to the current picture. A first parameter set in the data stream which relates to the current picture is used to identify a first set of reference pictures included in a view different from the current view and potentially serving as the second reference picture for coding units of the current picture as well as a reference timestamp of a reference picture which potentially serves as the first reference picture for coding units of the current picture. The first set of reference pictures thus coincides in timestamp with a current picture. The second parameter set contains, for each of a second set of reference pictures having one picture for each reference picture of the first set which coincides in view with the respective reference picture of the first set of reference pictures and is of the reference timestamp, a flag which indicates whether or not the respective picture of the second set of reference pictures is available as third reference picture. That is, in accordance with a second alternative, flags directly indicate the available or non-availability of the "third reference picture", denoted VA elsewhere in the description of the present application, and accordingly increases the error robustness and reduces the processing complexity involved in supporting residual prediction.

BRIEF DESCRIPTION OF THE DRAWINGS

Embodiments of the present invention will be detailed subsequently referring to the appended drawings, in which:

FIGS. 9a and 9b show tables of syntax examples for use in 3D-HEVC so as to from an implementation of an embodiment according to FIGS. 7 and 8;

FIGS. 12a and 12b show a derivation process for the target reference index for residual prediction;

FIG. 13 shows a general slice segment header syntax; and

FIGS. 14a and 14b show a derivation process for the target reference index for residual prediction.

DETAILED DESCRIPTION OF THE INVENTION

Figure 1:
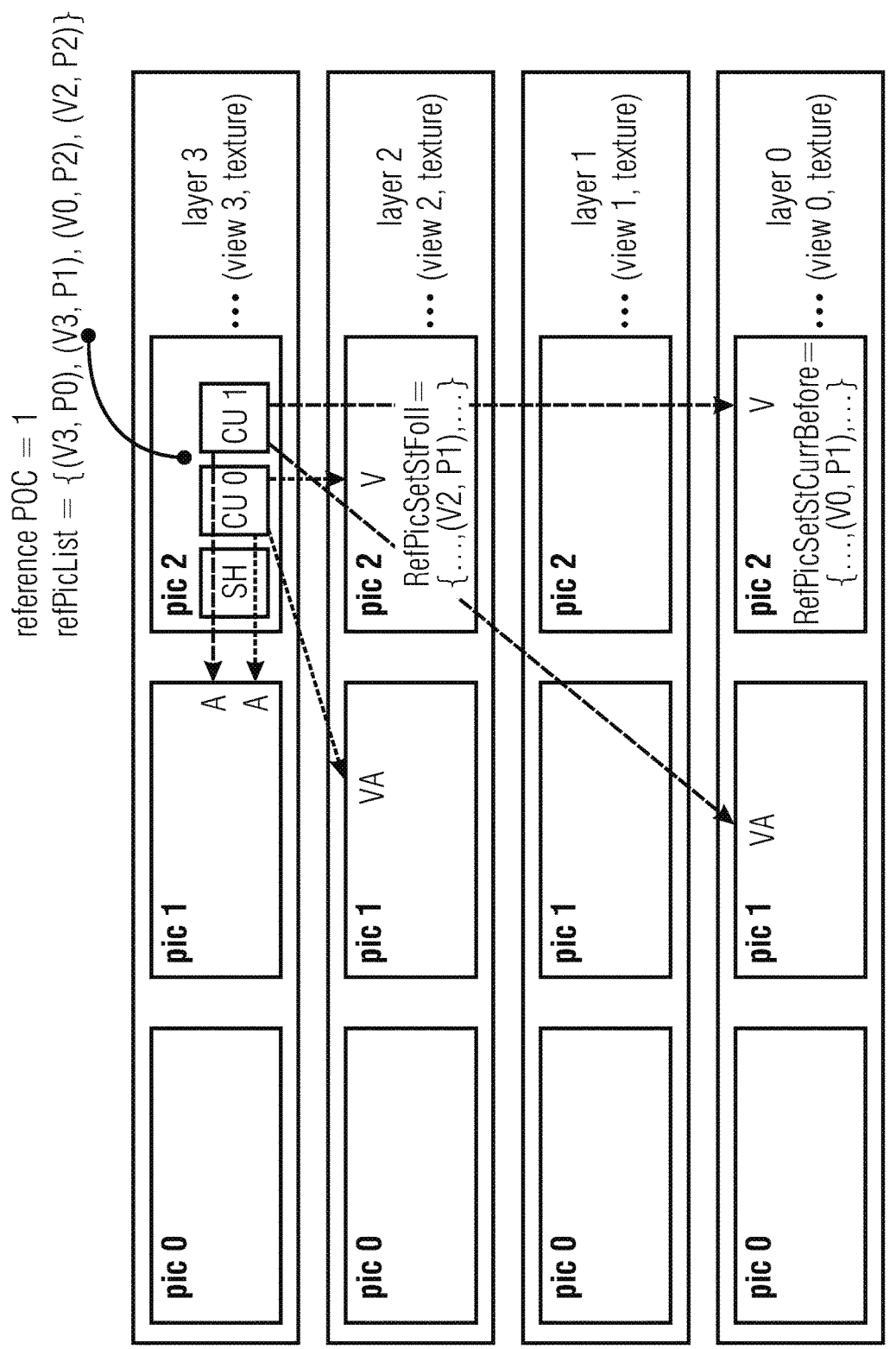
FIG. 1 shows a schematic diagram illustrating the reference pictures involved with coding units for which residual prediction might be applied in order to illustrate residual prediction and its dependencies for the current 3D-HEVC design.
Figure 2:
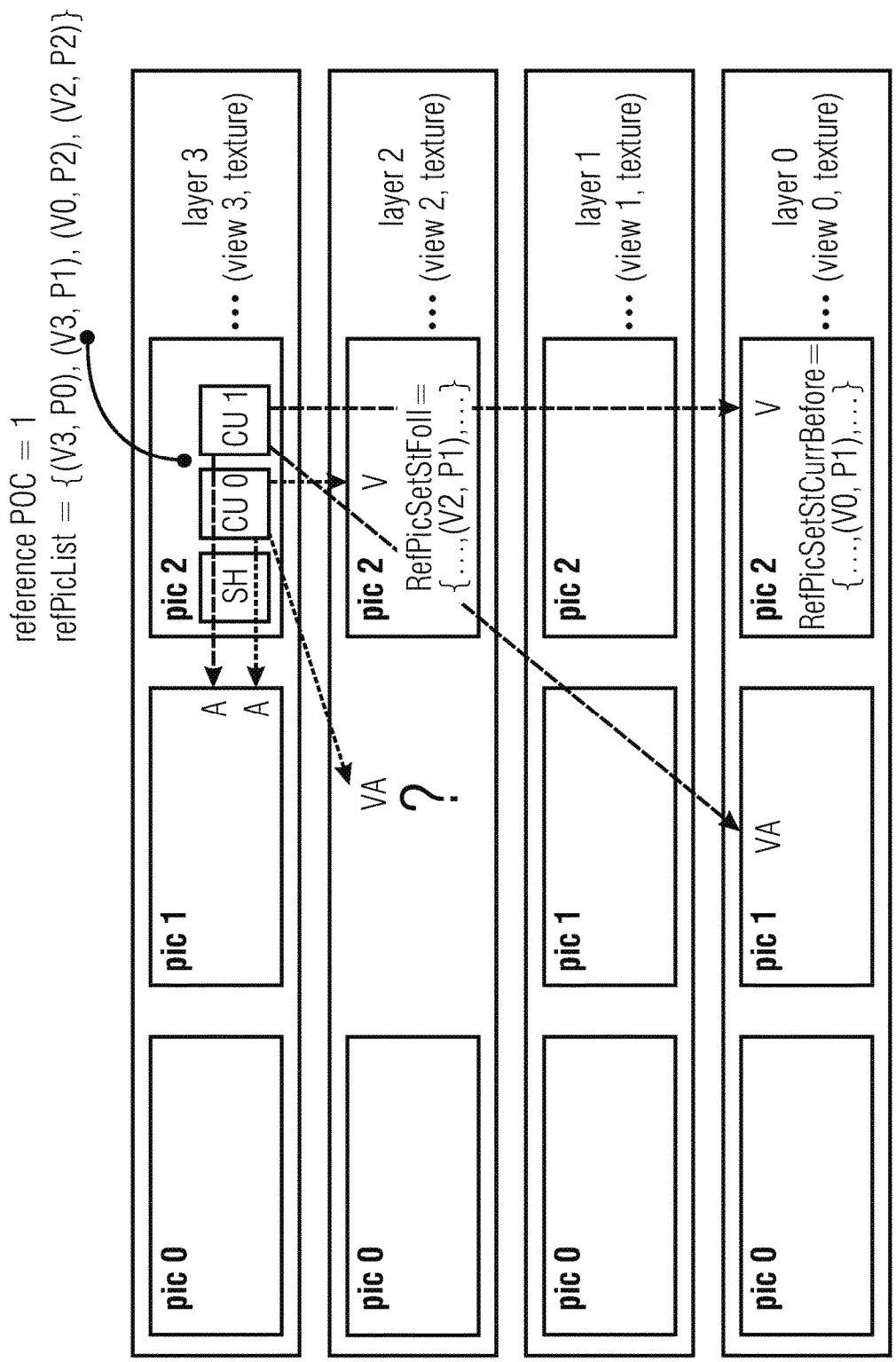
FIG. 2 shows a schematic diagram illustrating the same situation of FIG. 1 in case of picture loss for illustrating the problems occurring in such a situation.

Before describing various embodiments of the present application further below, the thoughts and advantages underlying these embodiments shall be explained by resuming the explanation of problems occurring in the current design of 3D-HEVC of the introductory portion of the specification of the present application and describing, on the basis of the examples described above and shown in FIGS. 1 and 2, solutions which may overcome the problems described.

An idea in accordance with a first aspect of the present application is to allow a direct detection of a loss of picture VA by enabling residual prediction only, when picture VA it is included in RefPicSetLtCurr, RefPicSetStCurrBefore, or RefPicSetStCurrAfter of picture V. It is a bitstream requirement, that pictures included in these sets are present in the DPB, when decoding picture V. Their presence is conventionally checked when decoding picture V. Thus, the loss of the picture VA would be detected already when decoding picture V, hence before decoding the current picture. Note that, between decoding of picture V and decoding the current picture, pictures included in RefPicSetLtCurr, RefPicSetStCurrBefore, or RefPicSetStCurrAfter of picture V are not removed from the DPB. Thus, the presence of picture VA when decoding picture V is sufficient to guarantee presence of picture VA in DPB when decoding the current picture.

Figure 3:
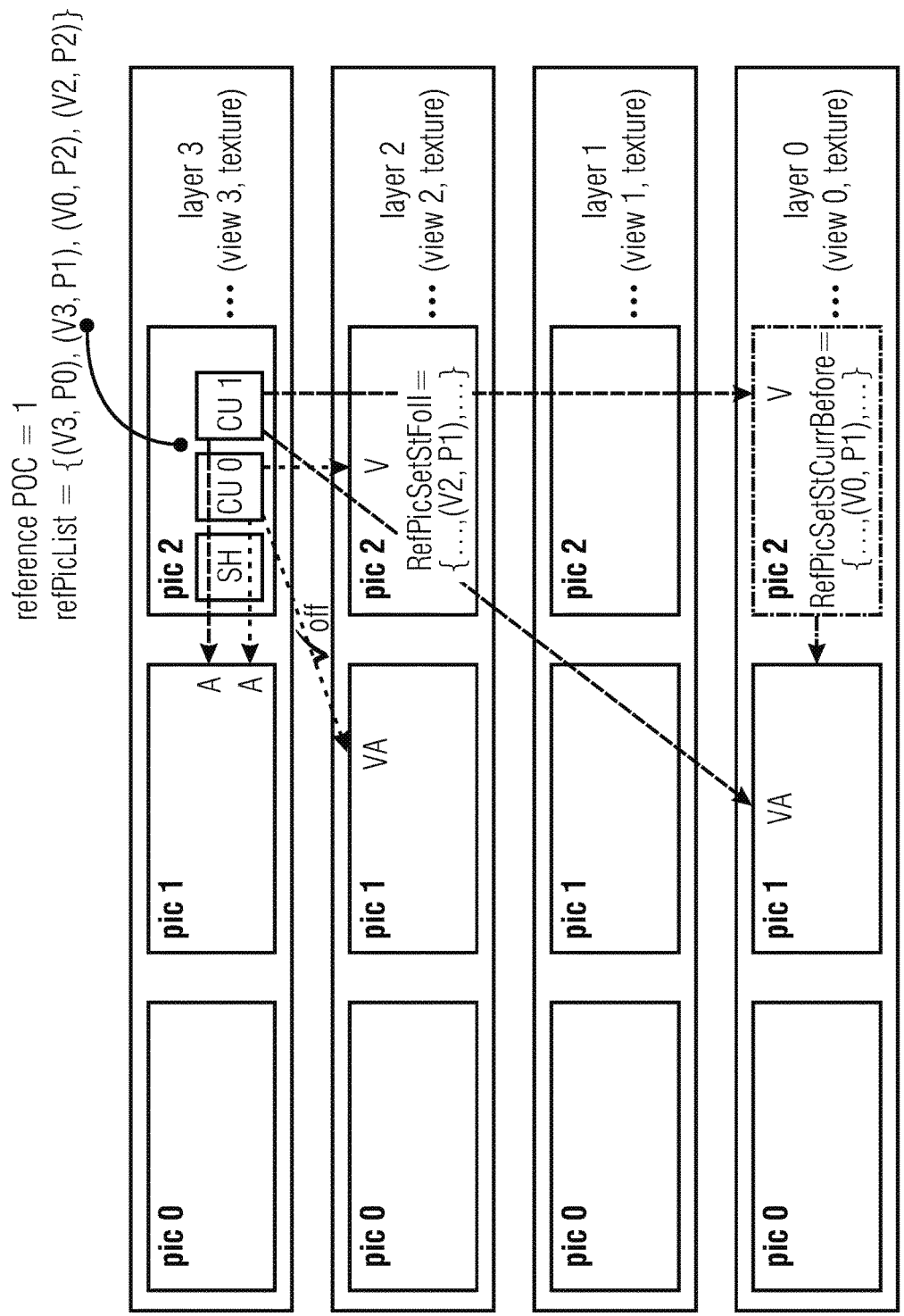
FIG. 3 shows a schematic diagram corresponding to FIGS. 1 and 2 for illustrating possibilities of solving the problem outlined with respect to FIG. 2.

See the Example 3 in FIG. 3. FIG. 3 depicts the decoding process using the just proposed solution. Picture 1 of view 2 (picture VA of CU 0) is included in RefPicSetStFoll of picture 2 of view 2 (picture V of CU 0), but not in RefPicSetLtCurr, RefPicSetStCurrBefore, or RefPicSetStCurrAfter of picture V of CU 0. Thus, residual prediction is disabled for CU 0, since it cannot be inferred whether the presence of picture VA of CU 0 in the DPB is mandatory.

Picture 1 of view 0 (picture VA of CU 1) is included in RefPicSetStCurrBefore of picture 2 of view 2 (picture V of CU 1). Thus, residual prediction is enabled for CU 1, since it is guaranteed that picture VA of CU 1 is present in the DPB. When picture VA of CU 1 would not be present, this would have been detected when decoding picture 2 of view 0, since the presence of picture 1 of view 0 is mandatory there by a bitstream constraint.

Specification changes in the current specification of 3D-HEVC could be as is shown in FIGS. 12a and 12b.

Please note that, in FIGS. 12a to 14b, insertions are indicated using underlining and canceled portions are shown struck through.

An alternative solution is exploited by embodiments in accordance with a second aspect of the present application described further below and is to:

Explicitly signal in the slice header of the current slice, which of the pictures VA potentially demanded by CUs of the current slice are present. (separately for both prediction list L0 and L1)

When a VA picture is signaled to be present, demand it to be present in the DPB by a bitstream constraint When the particular picture VA demanded for decoding the current CU is not signaled as present, disable residual prediction from the picture VA for the current CU.

This way access to RefPicSetLtCurr, RefPicSetStCurrBefore, RefPicSetStCurrAfter of picV can be avoided. However, additional signaling costs are intruded by additional slice header signalization.

Here, specification changes following the alternative solution may be as is shown in FIG. 13 or as is shown in FIGS. 14a and 14b.

After having exemplified and illustrated the thoughts and advantages of embodiments of the present application described further below, it is noted that the fact that the above illustration specifically referred to the current design of 3D-HEVC shall not be interpreted as a restriction of the subsequently described embodiments by any extent. That is, although the subsequently described embodiments emerged on the basis of thoughts explained above, they may be implemented in a manner differing from 3D-HEVC. In other words, although the embodiments described below may be implemented to result in a 3D-HEVC codec with the advantages set out above, the embodiments described below may alternatively be implemented differently.

Figure 4:
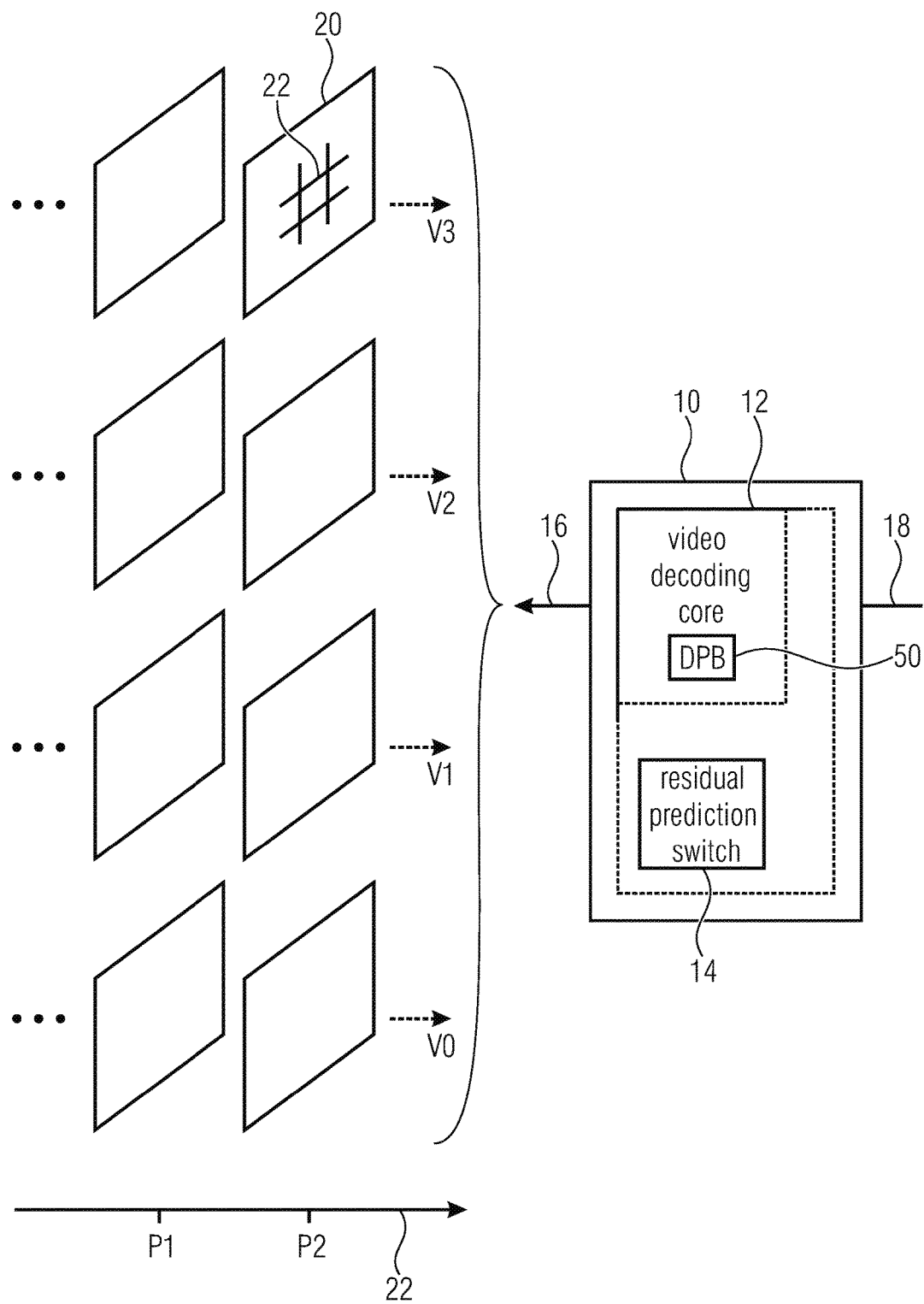
FIG. 4 shows a block diagram of a multi-view video decoder in accordance with an embodiment schematically illustrating pictures of an example for a multi-view video.

FIG. 4 shows a multi-view video decoder 10 in accordance with an embodiment of the present invention. The multi-view video decoder 10 comprises a video decoding core 12 and a residual prediction switch 14. As illustrated in FIG. 4, the residual prediction switch 14 may, in fact, be included into the video decoding core 12.

The video decoding core 12 is configured to decode a multi-view video 16 from a data stream 18 received by the multi-view video decoder. In FIG. 4, the plurality of views comprised by the multi-view video 16 is four in order to ease the comparison of the embodiment of FIG. 4 with the description brought forward above with respect to FIG. 3, but the number of views may alternatively be lower than four, such as two or any number greater than two. Each view V0 . . . V3 is composed of a temporal sequence of pictures so that each picture 20 belongs to a certain timestamp $P_i$ along the temporal axis 22, wherein FIG. 4 shows, for illustration purposes, merely pictures belonging to two consecutive timestamps P1 and P2. The pictures of the various views show, for instance, a common scene at the different time instances or timestamps P from different view positions corresponding to the views $P_j$.

The video decoding core supports residual prediction of coding units of a current picture 20 of a current view. This means the following. The video decoding core 12 decodes pictures 20 of the views V1 . . . V4 in units of coding units into which pictures 20 are subdivided. For instance, coding units may be leaves of a recursive multi-subdivision of tree root blocks into which the pictures 20 are, regularly in rows and columns, pre-subdivided. However, this is merely an example and the coding unit itself may form a regular subdivision of the pictures in rows and columns. The video decoding core obeys, in decoding data stream 18, a certain decoding order of the coding units of pictures 20. The video decoding core 12 may, for instance, decode the coding units sequentially along the decoding order. Alternatively, the video decoding core 10 may use parallel processing in order to decode coding units of the pictures in parallel with, however, obeying the decoding order defined among the coding units so that portions of pictures of the video 16 preceding the current coding unit in terms of the decoding order have already been processed/decoded. The decoding order may, for instance, traverse the coding units picture-wise, with traversing the pictures of one timestamp before proceeding to the coding units of pictures of another timestamp. The decoding order traverses, for example, the pictures of a certain timestamp sequentially along a view index i of views $V_i$.

Different coding modes may be associated with the coding units. The data stream 18 may signal these coding modes. For instance, some coding units may be motion-compensatedly predicted coding units which are predicted by the video decoding core 12 temporally by use of motion-compensated prediction on the basis of reference pictures which proceed in decoding order, but are of the same view. Other coding units may be disparity-compensatedly predicted coding units which the video decoding core 12 predicts using disparity-compensated prediction on the basis of pictures of, in terms of decoding order, preceding/lower layers belonging to the same time instant/timestamp.

Even further coding units may be intra-coded coding units for the decoding of which the video decoding core 12 neither uses temporal nor inter-view prediction. Spatial prediction, for instance, may be used for such intra-coded coding units.

The video decoding core 12 supports the residual prediction of a predetermined motion- or disparity-compensatedly predicted coding unit of a current picture 20 of a current view on the basis of a first reference picture of a current view, a second reference picture of a reference view, coinciding in timestamp at the current picture, and a third reference picture of the reference view coinciding in timestamp with a first reference picture. For illustration purposes, FIG. 4 illustrates a coding unit 22 in picture 20 of view V3 at timestamp P2. This coding unit 22 may be, for instance, the current coding unit.

Figure 5:
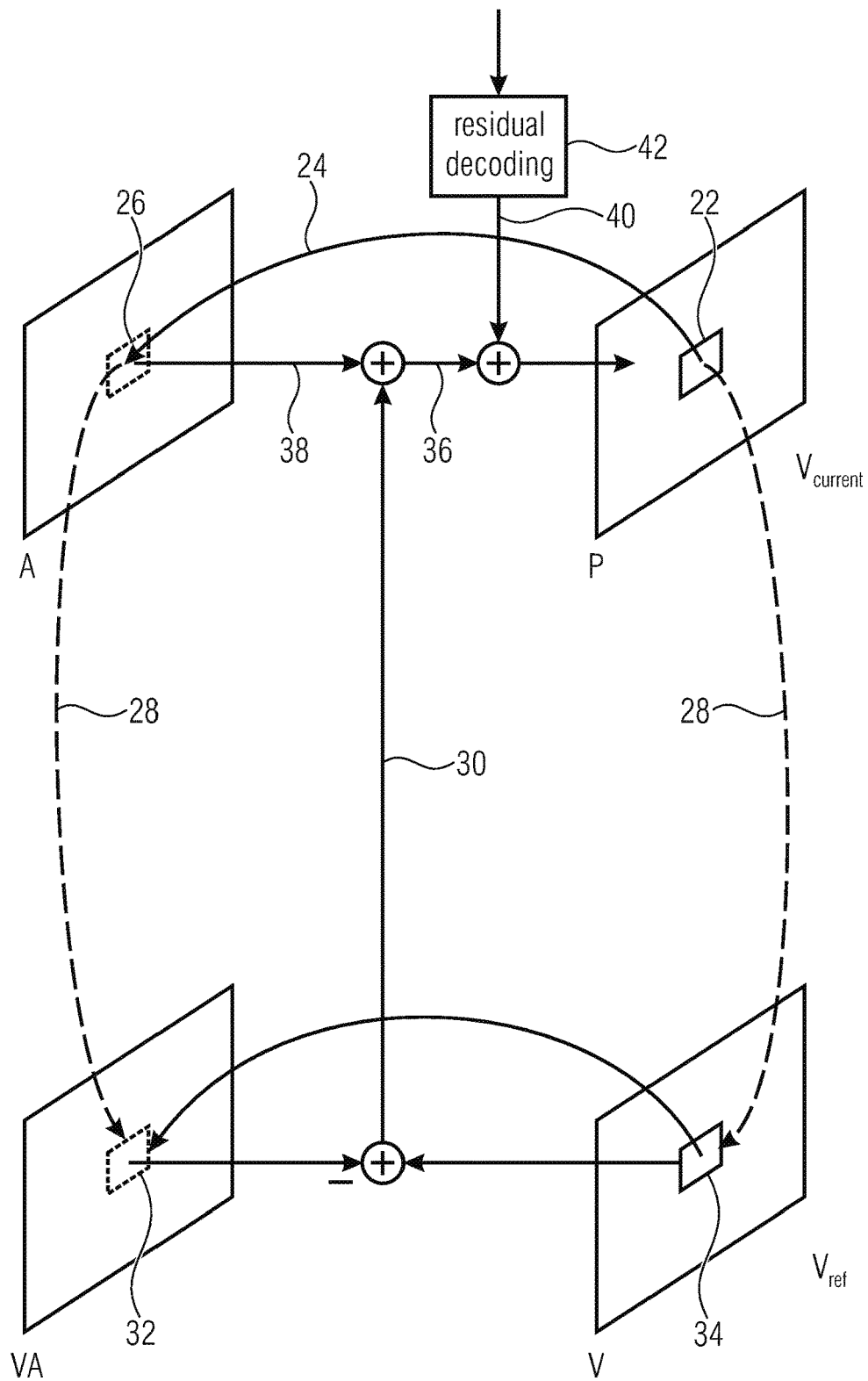
FIG. 5 shows a schematic diagram illustrating the residual prediction process of a motion-compensatedly predicted coding unit in accordance with an embodiment.

As will be described below with respect to FIGS. 5 and 6, the video decoding core 12 may be configured to, in subjecting a current coding unit 22 to residual prediction, determine a subset of reference pictures out of the first, second and third reference pictures A, V and VA depending on the predetermined motion- or disparity-compensatedly predicted coding unit 22 being a motion-compensatedly predicted coding unit or a disparity-compensatedly coding unit performing the residual prediction using the determined subset of reference pictures. For instance, FIG. 5 shows current picture P, first reference picture A, second reference picture V and third reference picture VA of picture P and illustrates a current coding unit 22 which is assumed to be a motion-compensatedly predicted, i.e. temporally predicted, coding unit. That is, the data stream indicates that the coding unit 22 is to be temporally predicted and signals motion data such as one or more motion vectors 24 using which the coding unit 22, i.e. the picture block covered by coding unit 22, is to be predicted from the corresponding portion 26 pointed to by motion information 24 and lying within reference picture A. The details on whether or not residual prediction is applied to coding unit 22 are set out in more detail below. If, however, coding unit 22 is to be subject to residual prediction, video decoding core 12 may act as follows. Using disparity information 28 which the video decoding core 12 may derive from depth maps coded into the data stream 18 or by a respective additional signaling in the data stream or from coding units temporally or spatially adjacent to the current coding unit, and optionally by use of motion information such as motion information 24 or motion information conveyed for picture V, the video decoding core 12 locates corresponding portions 32 and 34 in reference pictures VA and V and forms a difference 30 of these portions 32 and 34 and uses a sum 36 of the first stage prediction signal 38 obtained by using of motion information 24 from portion 26 on the one hand and the difference signal 30 on the other hand as the final prediction 36 of coding unit 22. Video decoding core 12 may add to this prediction signal 36 a residual signal 40 by deriving the residual signal 40 from the data stream using residual decoding 42, which may, for instance, involve entropy decoding or transform coefficient levels, the quantization of the transform coefficient levels and spectral-to-space-transforming the dequantized transform coefficients. The result of adding the final prediction signal 36 and the residual signal 40 may be used to reconstruct the content of coding unit 22.

Figure 6:
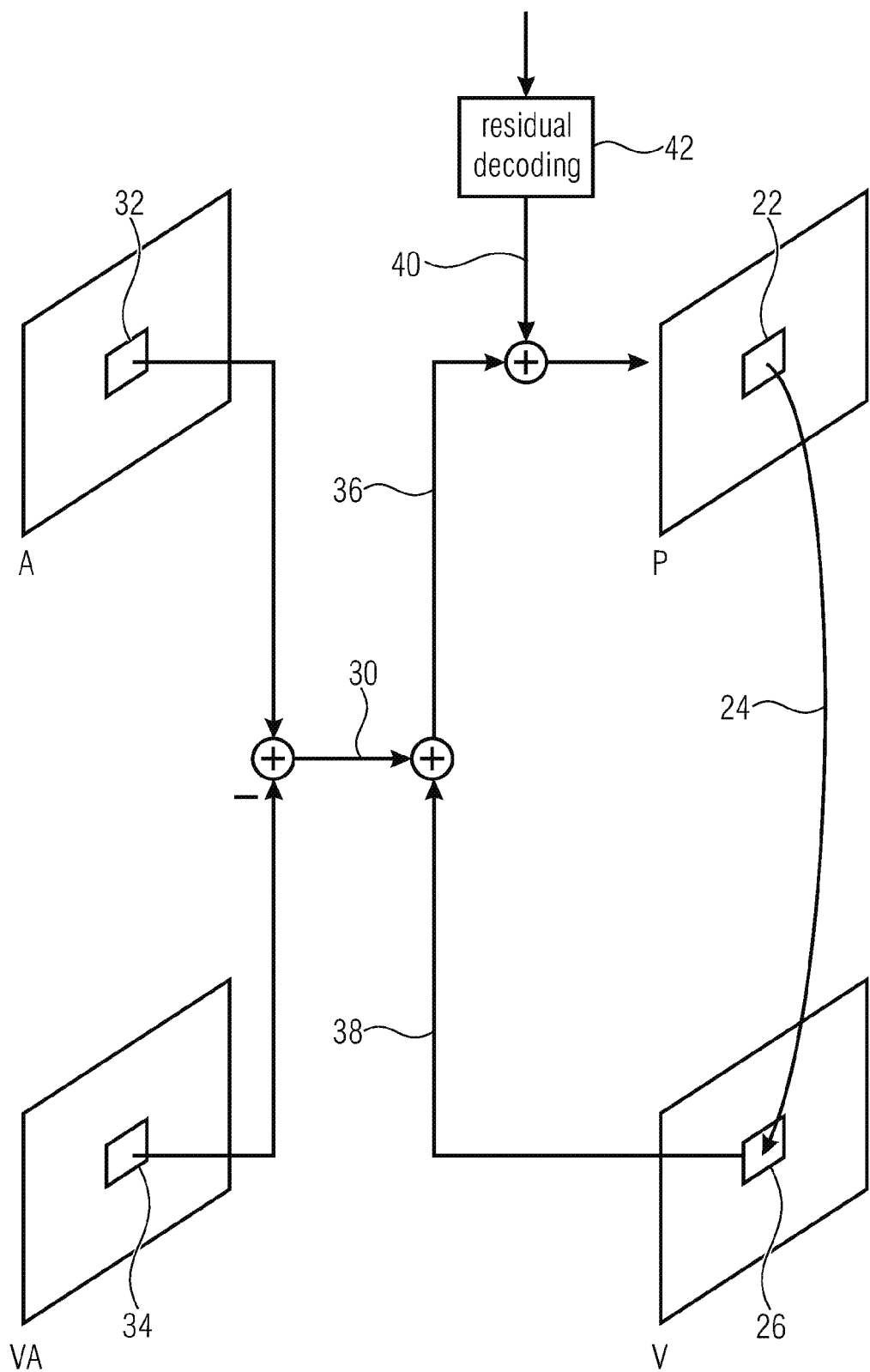
FIG. 6 schematically illustrates the process of the reconstruction of the coding unit involving residual prediction like FIG. 5, but here illustrated for a disparity-compensatedly predicted coding unit.

FIG. 6 illustrates the case that the coding unit 22 is a disparity-compensated, i.e. inter-view predicted, coding unit for which the data stream 18 signals that this coding unit is inter-layer predicted along with motion information 24 which, however, now represents disparity information such as one or more vectors pointing to the corresponding portion 26 which, however, now lies within reference picture V. In this situation, the video decoding core 12 forms the difference signal 30 from corresponding portions 32 and 34 now lying, however, in pictures A and VA at positions located, for instance, by the video decoding core 12 by use of temporal information or motion vectors such as temporal information or motion vectors conveyed in the data stream for reference picture V and optionally disparity information such as disparity information 24 or disparity information otherwise derived from the data stream to account for the relative disparity shift between portions 32 and 34. The sum of the first stage prediction signal 38 obtained by copying from portion 26 on the one hand and the difference signal 30 on the other hand is, again, used as the final prediction signal 36 which is then used to reconstruct the portion of picture P covered by coding unit 22 with or without adding the residual signal 40 to prediction signal 36.

It should be noted that FIG. 5 concentrated on the case that residual prediction is used for a temporally predicted picture P. If not being used, however, the reference picture within the same view/layer the current picture may be different than the one depicted in FIG. 5, i.e. different than the one serving as picture A in case of residual prediction being applied. A reference index may be signaled for coding unit 22, which selects one out of a set of temporal reference pictures of the current picture P. Such set of reference pictures is mentioned later with respect to the layer/view of picture V with respect to reference sign 48. Reference picture A, i.e. the one used in case of residual prediction being applied, may by the "temporally nearest" picture and may be selected inherently/automatically if residual prediction applies. Picture V may be chosen for picture P by explicit signaling such as by explicit appointment an associated reference picture V for each available temporal reference picture or inherently. In case of FIG. 6, i.e. in case of an inter-layer predicted picture P, picture V may be signaled be a reference index and picture A may be again the "temporally nearest" out of the available set of reference pictures.

That is, FIGS. 5 and 6 represent an example where the decoding core 12 used reference pictures VA and V in order to predict the prediction residual of the temporal first stage prediction 38 in case of the coding unit 22 being temporally predicted, and reference pictures A and VA in order to predict the prediction residual of the inter-view prediction signal 38 in case of the coding unit 22 being inter-view predicted. In both cases, all pictures A, V and VA are involved in the reconstruction process, but it should be noted that the embodiment of FIGS. 5 and 6 is merely an example and modifications are feasible.

As explained in more detail below, not all of the motion- or disparity-compensatedly predicted coding units are subject to residual prediction by the video decoding core 12. Rather, the decision whether or not a current coding unit of the motion- or disparity-compensatedly predicted type is subject to residual prediction depends, at least partially, on a result of a check performed by the residual prediction switch 14 which is described in more detail below. "Partially" means that the data stream 18 may, for instance, convey a signalization signaling for the current coding unit 22 whether or not same is to be subject to residual prediction. However, such signalization may be contained within the data stream 18 merely in case of the residual prediction switch enabling residual prediction for this coding unit. In accordance with this alternative, the video decoding core 12 would already be responsive to the residual prediction switch with respect to the parsing procedure, i.e. in parsing the data stream 18. Only in case of the enablement of residual prediction for the current coding unit 22 would the video decoding core 12 read a signalization from the data stream signaling whether or not residual prediction is to be applied to the current coding unit. According to an alternative, such signalization for the coding unit 22 could be left off with performing residual prediction by decoding core 12 whenever residual prediction is enabled by switch 14, or could be inevitably signaled in the data stream for the coding unit 22 with the switch 14, however, modifying the residual prediction scheme so as to not rely on reference picture VA. For instance, instead of using the residual prediction scheme described above with respect to FIGS. 5 and 6, the decoding core 12 could, if disablement is signaled by a switch 14, perform a residual prediction by way of, for instance, spatial prediction of the first stage prediction signal 38 or by some other means. In any case, the video decoding core 12 applies or does not apply, depending on the residual prediction switch 14, the residual prediction, at least as far as the third reference picture is concerned, for the current coding unit.

Figure 7:
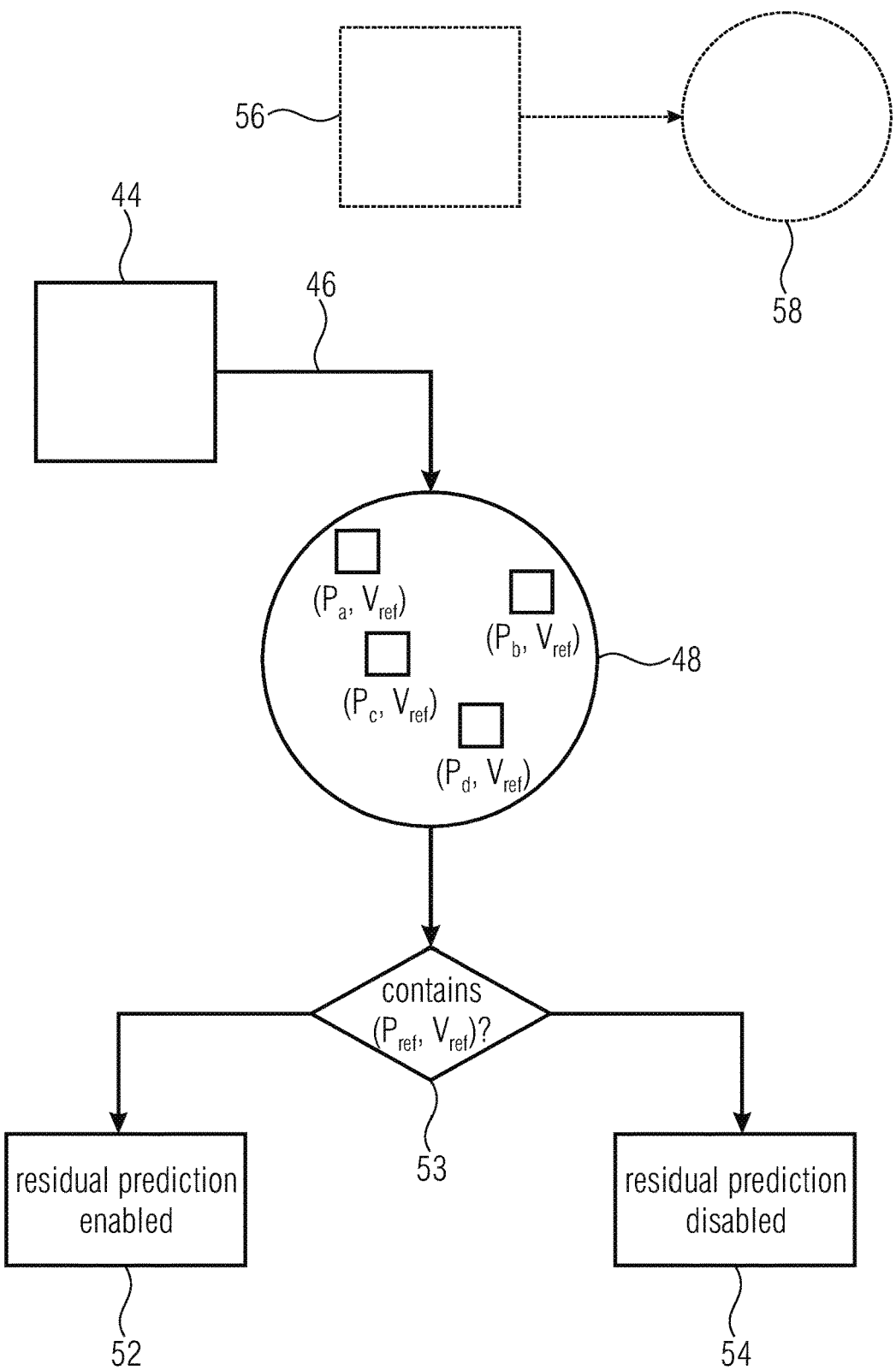
FIG. 7 shows a schematic diagram illustrating the enablement/disablement determination with respect to residual prediction at the decoding side as performed by residual prediction switch 14 of FIG. 4 in accordance with an embodiment.

In order to decide on the enablement or disablement of the residual prediction for current coding unit 22, residual prediction switch 14 is configured to evaluate a certain parameter set contained in the data stream as described with respect to FIG. 7.

In particular, as illustrated in Ag. 7, the residual prediction switch 14 reads from the data stream a parameter set 44. This parameter set 44 relates to reference picture V, which is assumed to have view index $V_{ref}$. The residual prediction switch 14 derives 46 therefrom a set 48 of all pictures that may be available for prediction/reconstruction of reference picture V and are of the reference view $V_{Vref}$. That is, set 48 contains all pictures of view $V_{ref}$ which may be in the decoded picture buffer of the video decoding core 12 at the time of decoding picture V. FIG. 4 illustrates the decoded picture buffer at reference sign 50. The video decoding core 12 empties, for example, and accordingly refills, the decoded picture buffer 50 on a timestamp-by-timestamp basis, i.e. each time having decoded pictures belonging to one timestamp. In other words, video decoding core 12 may maintain all pictures within the decoded picture buffer 50 until the finalization of decoding of the pictures belonging to the current timestamp so that the pictures belonging to the set 48 are mandatory and guaranteed to be also present in the decoded picture buffer 50 at the time of decoding the current picture of view $V_{curr}$. As a side note it should be mentioned that set 48 may be a super set relative to a set of reference pictures of reference view $V_{ret}$ which may actually referred to by corresponding indices in the CUs or prediction units of picture V. In HEVC notation, set 48 would be the union of RefPicSetLtCurr, RefPicSetStCurrBefore, RefPicSetStCurrAfter. A set of reference pictures of the reference picture V that are not of the reference view $V_{ref}$ would be, in HEVC notation, the union of RefPicSetInterLayer1, and RefPicSetInterLayer0. The subset of reference pictures, thus the subset of pictures in a union of RefPicSetLtCurr, RefPicSetStCurrBefore, RefPicSetStCurrAfter, RefPicSetInterLayer1, and RefPicSetInterLayer0, actually referred to by the reference indices of motion-compensated and disparity-compensated prediction blocks of CUs within picture V would be RefPicList (per hypothesis if the current picture is a multi-hypothesis predicted picture) and is derived from the union using parameters of the slice header. The pictures in subset of reference pictures being RefPicList may actually be referred to by prediction units of the reference picture V, when predicting the reference picture V.

As described above, in connection with 3D-HEVC, the parameter set 44 inspected by residual prediction switch 14 may, for instance, be scattered in the data stream 18 across portions of the data stream 18 of different "scope", such as the video picture set VPS and the slice header of the current picture. Set 48 may be the union of RefPicSetStCurrBefore, RefPicSetStCurrAfter and RefPicSetLtCurr. These sets contain all reference pictures that may be used for inter-prediction of the current picture and one or more pictures that follow the current picture in decoding order. As explained above, the multi-view video decoder 10 may be configured to read from the data stream 18 another parameter set 56 which also relates to reference picture V in order to derive therefrom a further set 58 of reference pictures of the reference view $V_{ref}$. The latter set 58, however, is a facultative set of reference pictures. They are to be maintained in the decoded picture buffer 50 merely in case of the multi-view video decoder currently comprises any of these pictures, namely for use in prediction of the pictures of the reference view following reference picture V in decoding order. In other words, set 58 consists of all reference pictures that are not used for inter-prediction of picture V, but may be used in inter-prediction for one or more pictures of view $V_{ref}$ that follow picture V in decoding order. Accordingly, sets 48 and 58 are distinct, i.e. do not overlap or do not have any picture in common. The check 53 whether set 48 comprises picture VA, namely the picture of the reference view $V_{ref}$ coinciding in timestamp $P_{ref}$ with reference picture A as performed by residual prediction switch 14 so as to enable 52 or disable 54 the residual prediction is independent from set 58. The check 53 is also independent from the third reference picture's VA actual presence in the decoded picture buffer 50, thereby avoiding the need for residual prediction switch 14 to check this presence, which check would, as described above, suffer from the inability to distinguish between an absence of reference picture VA due to transmission loss and by intention of the video encoder having generated bitstream 18.

As already described above, the multi-view video decoder could, in order to obtain $P_{ref}$, i.e. could identify reference picture A by inspecting, i.e. reading and deriving, a corresponding parameter set in the data stream 18 for current picture P with determining that picture in the corresponding set of reference pictures of current picture P to be the reference picture A which is temporally nearest to the current picture P, i.e. the picture within the set of reference pictures that may be available for prediction/reconstruction of the current picture P and are of the same view as picture P with a timestamp nearest to the timestamp of picture P.

Figure 8:
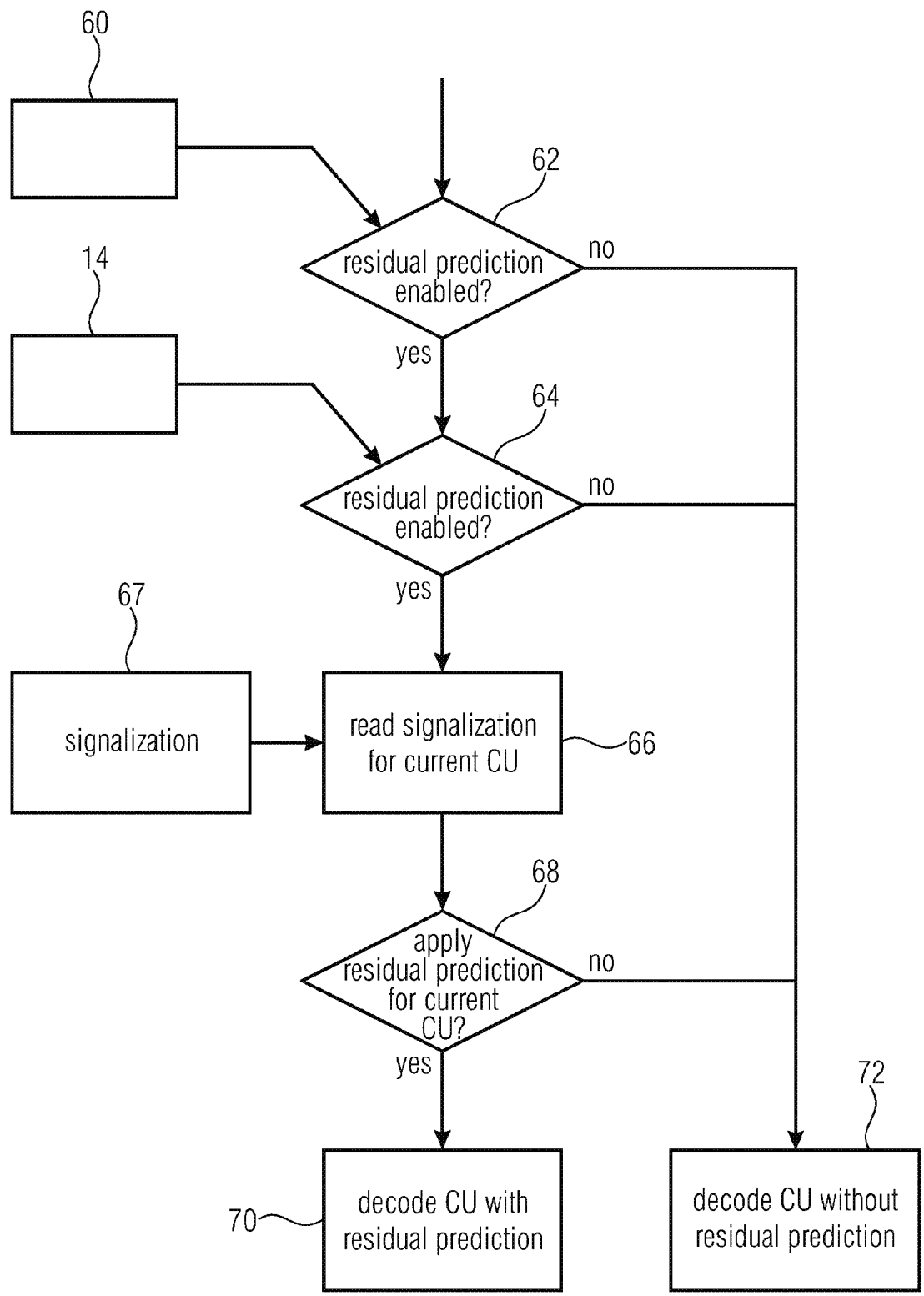
FIG. 8 shows a schematic diagram illustrating the dependency of the application or non-application of residual prediction with respect a coding unit by the video decoding core of FIG. 4 and its dependency on the enablement/disablement determination of FIG. 7 in accordance with an embodiment.

An example for a responsiveness of the video decoding core 12 to the residual prediction switch 14 is illustrated in FIG. 8. FIG. 8 shows an example where, in addition to the dependencies outlined above, the decision whether residual prediction is applied to a certain coding unit additionally depends on a flag 60 in the data stream 18 which generally enables or disables, or switches on or off, the residual prediction. The scope of flag 60 may, for instance, be the whole video, an access unit, i.e. or pictures belonging to one timestamp, or the current picture. Flag 60 and the corresponding check 62 shown in FIG. 8 are optional. That is, multi-view video decoder 10 would check 62 whether residual prediction is enabled anyway on the basis of flag 60. It should be noted that the above example using the for next loop "range of 0 to num_ref_idx_IX_active_minus1" rendered clear that the enablement/disablement may alternatively be signaled by syntax elements such as syntax elements signaling the non-availability of any temporal reference picture for picture the current picture P anyway.

Multi-view video decoder 10 would also check 64 whether residual prediction switch 14 enabled or disabled the residual prediction in steps 52/54 of FIG. 7. Merely of both checks 62 and 64 confirm the enablement of the residual prediction, the multi-view video decoder 10, or the video decoding core 12, reads a signalization 67 for the current coding unit from the data stream 18 which specifically signalizes for the current coding unit whether or not residual prediction is to be applied for the current coding unit. Subsequent to the reading 66, the video decoding core 12 checks the signalization 67 read in step 66, namely in step 68, so as decode the current coding unit using residual prediction in 70 in case of the signalization confirming the application of the residual prediction, and decode the current coding unit in steps 72 without residual prediction in case of the signalization read in steps 66 signaling that the residual prediction is not to be applied although being enabled. The decoding of the current coding unit using residual prediction in step 70 may be performed as described above with respect to FIGS. 5 and 6, wherein the decoding according to step 72, i.e. without residual prediction, may coincide with this procedure except for the fact that the difference signal 30 is not determined so that the first stage prediction signal 38 becomes the final prediction signal 36.

If any of checks 62, 64 and 68 result in the residual prediction not being enabled or not to be applied for the current coding unit, then the current coding unit is coded without residual prediction. In case of no-enablement being the result of any of checks 62 and 64, the signalization is not even read, i.e. the reading is skipped.

It should be noted that owing to the fact that set 48 collects all pictures which are obliged to be present in the decoded picture buffer 50 of decoder 10, the multi-view video decoder 10 detects that reference picture VA is lost if picture VA is included in this set 48, but absent in the decoded picture buffer 50. If so detected, multi-view video decoder may, for instance, initiate or enter an error resilience mode. For example, the multi-view video decoder may resume decoding the bitstream from the next intra-coded picture onwards, or may use a substitute picture as a substitution of a reference picture VA.

Thus, the above description revealed, in other words, a multi-view video decoder comprising a video decoding core, e.g. 3D-HEVC core, 12 configured to decode, in units of coding units of pictures, a plurality of views $V_i$ from a data stream 18, the video decoding core 12 supporting motion- or disparity-compensated residual prediction of a predetermined motion- or disparity-compensatedly predicted coding unit of a current picture of a current view on the basis of a first reference picture A of the current view, a second reference picture V of a reference view, coinciding in timestamp with the current picture, and a third reference picture VA of the reference view, coinciding in timestamp with the first reference picture A. For example, a disparity compensated prediction of CU of current picture from second reference picture using disparity vector v is followed by predicting the residual of this prediction by applying a disparity vector corresponding to v onto a collocated (to CU) portion of the first reference picture so as to predict the same by disparity-compensated prediction from the third reference picture; merely the then remaining residual might by entropy coded for CU into data stream. Or motion compensated prediction of CU of current picture from first reference picture using motion vector v is followed by predicting the residual of this prediction by applying a motion vector corresponding to v onto a collocated (to CU) portion of the second reference picture so as to predict the same by motion-compensated prediction from the third reference picture; merely the then remaining residual might by entropy coded for CU into data stream.

Further, the multi-view video decoder may comprise a disparity-compensated residual prediction switch configured to read a parameter set, e.g. slice header, from the data stream, the parameter set relating to the second reference picture, and derive therefrom the set of all reference pictures that can be used for prediction of the second reference picture and are of the reference view, wherein this set is, e.g. the union of RefPicSetStCurrBefore, RefPicSetStCurrAfter, RefPicSetLtCurr in HEVC, i.e. union of pictures of the layer of the second picture that are demanded to be present when decoding the second reference picture. This set is, thus, demanded to be present (in the DPB) when decoding the second reference picture and is also present at the time of decoding the current picture as same belong to the same timestamp or AU and the DPB is emptied AU wise and owing to the coding/decoding order which traverses the views of one timestamp first before proceeding with the next timestamp in coding/decoding order. The disparity-compensated residual prediction switch may further be configured to check whether the third reference picture is included in the set of reference pictures; depending on the check, if the third reference picture is included in the set of reference pictures, enable the disparity-compensated residual prediction for the current coding unit; depending on the check, if the third reference picture is not included in the set of reference pictures, disable the disparity-compensated residual prediction for the current coding unit.

The video decoding core is configured to be responsive to the disparity-compensated residual prediction switch in order to apply or not apply disparity-compensated residual prediction based on the third reference picture for the current coding unit. Please note: in another list the CU could use a further alternative "reference picture", so that residual prediction may actually be used for the current CU. (Die CU könnte in einer anderen Liste nock ein alternatives "reference picture" verwenden, so dass doch residual prediciton fur die aktuelle CU verwendet wird).

The residual is predicted by combination of sample values of the first or second picture with samples values of the third picture.

According to above, where residual prediction can be additionally disabled by other flags.

Both reference picture lists could be processed. Here, the timestamp of the first reference picture could differ for the first and the second list.

Note that the third reference pictures indicated to be available by flags are demanded to be present in the DPB.

The residual is predicted by combination of sample values of the first or second picture with samples values of the third picture, when enabled.

Only temporal or inter-layer prediction might be applied, when residual prediction is disabled.

If so, residual prediction can be additionally disabled by other flags or by conditions in the decoding process.

Figure 9B:
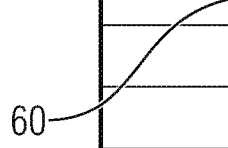

FIGS. 9a and 9b show examples of how a possible extension of a CU syntax and SPS syntax of 3D-HEVC could look in order to form an intensification of the embodiments described above with respect to FIGS. 4 to 8, wherein reference signs and hints to reference signs used in FIGS. 4 to 8 are added in FIGS. 9a and 9b to show the concordance between syntax elements shown in FIGS. 9a and 9b and the syntax elements and parameter sets denoted in FIGS. 4 to 8, and illustrates the possibility that the signalization 67 could be dependent on the enablement/disablement, but as already noted above, this dependency may also be left off for, for example, parsing robustness reasons so as to be, for example, merely dependently present in the data stream dependent on the also optional flag 60.

Figure 10:
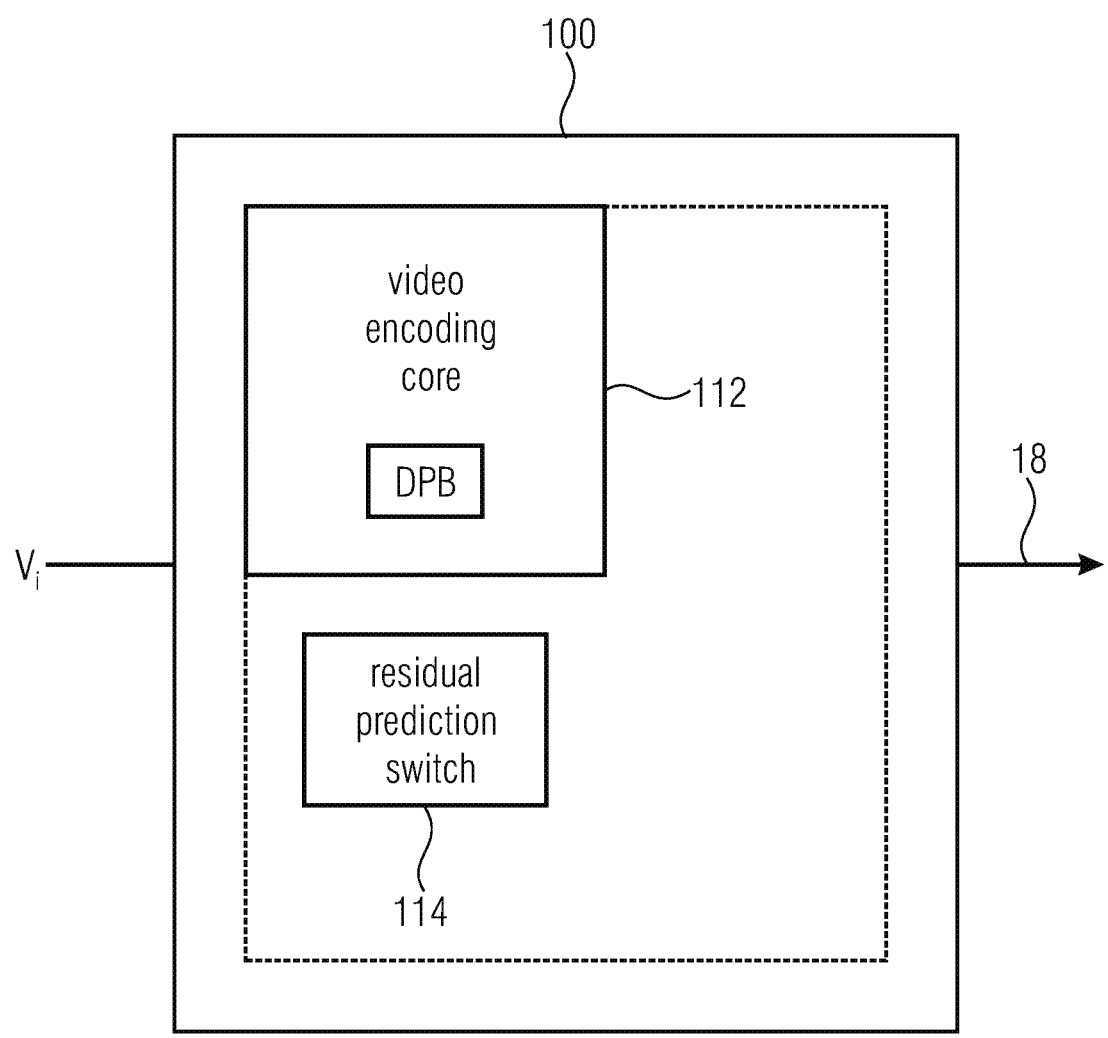
FIG. 10 shows a block diagram of a multi-view video encoder fitting to the decoder of FIG. 4 in accordance with an embodiment.

For the sake of completeness, FIG. 10 shows a multi-view video encoder 100 which could fit to the multi-video decoder of FIG. 4 in that the video encoder 100 of FIG. 10 is able to generate a data stream 18 decodable by decoder 10 of FIG. 4. The multi-view encoder 100 of FIG. 10 comprises a video encoding core 112 and a residual prediction switch 114 which may or may not be included within the video encoding core 112. The functionality of the multi-view video encoder 100 and the elements 112 and 114 substantially mirrors the functionality of the multi-view video decoder 10 and its internal elements. That is, the video encoding core 112 is configured to encode the plurality of views V, into the data stream 18 in a manner supporting residual prediction of motion- or disparity-compensatedly predicted coding units on the basis of reference pictures A, V and VA. The residual prediction switch 114 is configured to insert parameter set 44 into data stream 18 and depending on reference picture VA being included in set 48 enables or disables residual prediction for a current coding unit. The video encoding core applies or does not apply, depending on the residual prediction switch 114, residual prediction based on reference picture VA, or at least with respect to reference picture VA, for the current coding unit.

The residual prediction switch may be configured to perform the enabling and disabling depending on the check in a manner independent from the third reference being present or absent in a decoded picture buffer of the multi-view video encoder.

The video encoding core may be configured to determine a subset of reference pictures out the first, second and third reference pictures depending on the predetermined motion- or disparity-compensatedly predicted coding unit being a motion-compensatedly predicted coding unit or a disparity-compensatedly predicted coding unit and perform, if enabled by the residual prediction switch, the residual prediction of the predetermined motion- or disparity-compensatedly predicted coding unit using the determined subset of reference pictures.

The video encoding core may be configured to perform, if enabled by the residual prediction switch, the residual prediction of the predetermined motion- or disparity-compensatedly predicted coding unit using the second and third reference pictures if the predetermined motion- or disparity-compensatedly predicted coding unit is a motion-compensatedly predicted coding unit, and the first and third reference pictures if the predetermined motion- or disparity-compensatedly predicted coding unit is a disparity-compensatedly predicted coding unit.

The video encoding core may further be configured to predict he predetermined motion- or disparity-compensatedly predicted coding unit using the first reference picture if the predetermined motion- or disparity-compensatedly predicted coding unit is a motion-compensatedly predicted coding unit, and the second reference picture if the predetermined motion- or disparity-compensatedly predicted coding unit is a disparity-compensatedly predicted coding unit, and apply, if enabled by the residual prediction switch, the residual prediction of the predetermined motion- or disparity-compensatedly predicted coding unit to a prediction residual of the prediction.

The video encoding core may be configured to if the residual prediction of the predetermined motion- or disparity-compensatedly predicted coding unit is enabled by the residual prediction switch, insert a signalization into the data stream signaling whether the residual prediction is to be applied to the predetermined motion- or disparity-compensatedly predicted coding unit or not, if the residual prediction of the predetermined motion- or disparity-compensatedly predicted coding unit is disabled by the residual prediction switch, skip inserting the signalization into the data stream, and apply the residual prediction to the predetermined motion- or disparity-compensatedly predicted coding unit if the residual prediction of the predetermined motion- or disparity-compensatedly predicted coding unit is enabled by the residual prediction switch, and the signalization signals that the residual prediction is to be applied to the predetermined motion- or disparity-compensatedly predicted coding unit.

The multi-view video encoder may be further configured to disable, irrespective of the residual prediction switch, the residual prediction of a predetermined motion- or disparity-compensatedly predicted coding unit of the current picture of the current view responsive to a flag in the data stream.

The residual prediction switch may be configured to enable and disable the residual prediction depending on the check with respect to the first, second and third reference pictures so that, depending on the check, a prediction residual of a first stage motion- or disparity-compensated prediction of the predetermined motion- or disparity-compensatedly predicted coding unit is coded into the data stream un-predictively or predictively.

The residual prediction switch configured to perform the inserting, checking, enabling and disabling per hypothesis if the current picture is multi-hypothesis predicted picture.

The description of FIGS. 4 to 10 related to the first aspect mentioned above when illustrating the problems involved in the current design of 3D-HEVC and possible ways to overcome same. The following embodiments relate to the second aspect mentioned above, according to which additional flags are spent in order to signal to the decoder the availability or non-availability of potential "third reference pictures" for all potential "V pictures".

Figure 11:
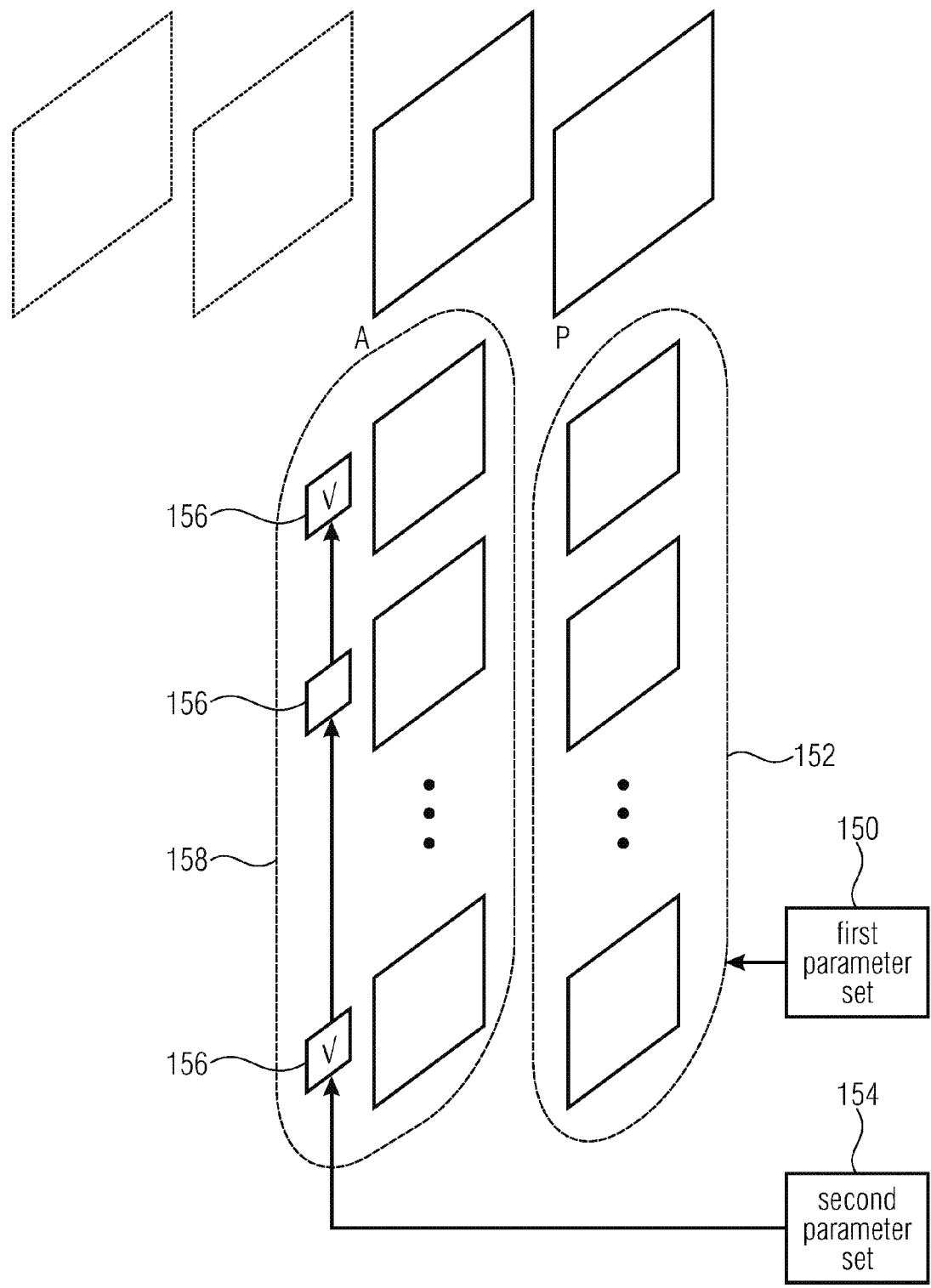
FIG. 11 shows a schematic diagram illustrating the enablement/disablement determination process shared between multi-view video encoder and multi-view video decoder in accordance with a second aspect of the present application.

In accordance with the second aspect, the multi-view video decoder largely coincides with the description brought forward above with respect to FIGS. 4 to 6. The same applies to the multi-view video encoder. However, as shown in FIG. 11, the enablement/disablement of residual prediction is, at least as far as the third reference picture VA is concerned, determined for a predetermined coding unit of a current picture differently. Here, the multi-view video encoder encodes into the data stream a first parameter set 150 which relates to the current picture P.

VPS and slice header may be inspected to collect the first parameter set, for example. On the basis of this parameter set 150, the multi-view video decoder or residual prediction switch 14 derives the set 152 of reference pictures included in views different from the current view and potentially serving as a second reference picture V for coding units of the current picture, i.e. the set 152 of pictures of reference layers relative to the layer of the current picture P. The first parameter set 150 also allows deriving therefrom the timestamp of the reference picture A of the current picture P. For all of these pictures in set 152 the multi-view video encoder inserts into the data stream 18, and the multi-view video decoder reads therefrom, a flag 156 indicating whether the layer of the respective picture of the same timestamp as reference picture A which is available as third reference picture VA for residual prediction. The flags are comprised by, or together form, a second parameter set 154. This parameter set might be included in the slice header of the current picture's slice(s). The "availability" of pictures of corresponding pictures 158 is thus determined at the decoding side by the residual prediction switch 14 on the basis of flags 156 only, thereby lowering the computational efforts at the decoding side. The multi-view encoder or its residual prediction switch determines the availability of the pictures in set 158 as indicated by the flags 156 in data stream 18 in a manner such that availability indicated by a flag 156 for a picture of set 158 only or exactly then if this picture belongs to the set of potential temporal reference pictures of the corresponding picture of the same layer/view in set 152, wherein the set had been denoted 48 with respect to one particular V reference picture of view/layer $V_{ref}$. That is, in accordance with FIG. 11, the availability is checked at the encoding side for each potential VA reference picture in set 158 temporally aligned to reference picture A and view-aligned to a corresponding picture of set 152 with the result being signaled in the data stream using flag 156.

Thus, the residual prediction switch 14 of the multi-view video decoder simply needs to inspect the second parameter set 154 in the data stream 18 which includes flags 156 in order to determine for each coding unit of current picture P whether residual prediction is enabled or disabled for the respective coding unit. Having thus determined the enablement/disablement in check 64 the remaining functionality of the multi-view video decoder and its core 12 and switch 14 would be the same as shown in FIG. 8. That is, the application/non-application signalization could be signaled within the data stream by the multi-view video decoder's switch and read by the switch 14 of the multi-view video decoder dependent on this enablement/disablement and a general enablement/disablement signalization 60 could be used as well.

Thus, with respect to FIG. 11, there has been described, in other words, a multi-view video decoder 10 comprising a video decoding core, e.g. 3D-HEVC, 12 configured to decode, in units of coding units of pictures, a plurality of views from a data stream 18, the video decoding core 12 supporting motion or disparity-compensated residual prediction of a predetermined motion or disparity-compensatedly predicted coding unit 220 of a current picture P of a current view on the basis of a first reference picture A of the current view, a second reference picture V of a reference view, coinciding in timestamp with the current picture, and a third reference picture VA of the reference view, coinciding in timestamp with the first reference picture. A disparity compensated prediction of CU of current picture from second reference picture using disparity vector v is followed by predicting the residual of this prediction by applying a disparity vector corresponding to v onto a—with taking motion compensation by use of a motion vector into account—collocated (to CU) portion of the first reference picture so as to predict the same by disparity-compensated prediction from the third reference picture; merely the then remaining residual might by entropy coded for CU into data stream.

Decoder 10 further comprises a disparity-compensated residual prediction switch 16 configured to read a parameter set 150, contained e.g. at least partially in the slice header, from the data stream, the parameter set relating to the current picture, and derive therefrom a first set 152 of reference pictures included in a view different from the current view and potentially serving as the second reference picture for coding units of the current picture and a reference timestamp of reference pictures which potentially serve as the first reference picture for coding units of the current picture; for each of a second set 158 of pictures comprising one picture for each reference picture of the first set which coincides in view with the respective reference picture of the first set of reference pictures, and is of the reference timestamp, read a flag from a picture scope or finer scope parameter set 154, e.g. in a slice header, within the data stream, the picture scope or finer scope parameter set relating to a portion, e.g. slice, of the current picture, the flag indicating whether the respective picture of the second set of pictures is available as third picture for motion- or disparity-compensated residual prediction. Note that not necessarily the whole set for which both coincidences are valid: merely those pictures of the greatest possible set which belong to the timestamp nearest to the timestamp of the current picture may be included in the second set. The flag could be ref_rp_ref_avail_flag.

The video decoding core is configured to be responsive to the flag related to a respective picture of the second set of pictures so as to apply or not apply motion or disparity-compensated residual prediction for a current coding unit comprised by the portion using the respective picture of the second set of pictures. Imagine the current CU uses disparity compensated prediction with respect to the second reference picture: if the third reference picture is indicated to be available, disparity-compensated residual prediction may be used for the residual prediction Both reference picture lists could be processed. Here, the timestamp of the first reference picture could differ for the first and the second list.

Note that the third reference pictures indicated to be available by flags are demanded to be present in the DPB.

The residual is predicted by combination of sample values of the first or second picture with samples values of the third picture, when enabled.

Only temporal or inter-layer prediction might be applied, when residual prediction is disabled.

If so, residual prediction can be additionally disabled by other flags or by conditions in the decoding process.

It should be noted that whenever prediction processes are described with respect to one of encoder or decoder, same processes are correspondingly likewise performed at the other side (decoder or encoder) so as to make sure that the predictions used are the same at encoder and decoder side, so that a description or claim concerning these processes with respect to one of decoder and encoder shall concurrently be interpreted as a corresponding basis for the other side.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream or signal can be stored on a digital storage medium or can be transmitted on a transmission medium such as a wireless transmission medium or a wired transmission medium such as the Internet. Where ever the insertion or encoding of some information into a data stream has been described, this description is concurrently to be understood as a disclosure that the resulting data stream comprises the respective information, syntax element of flag or so forth.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] L. Zhang, Y. Chen, X. Li, M. Karczewicz, "3D-CE4: Advanced residual prediction for multiview coding"; JCT3V-C0049

[2] L. Zhang, Y. Chen, X. Li, M. Karczewicz; "CE4: Advanced residual prediction for multiview coding", JCT3V-D0177

[3] T. Ikai; "CE4-related: ARP reference picture selection and its availability check"; JCT3V-F0105

[4] J.-L. Lin, Y.-W. Chen, Y.-L. Chang, Y.-W. Huang, S. Lei; "3D-HEVC HLS: On ARP reference picture signalling", JCT3V-G0053

[5] G. Tech, K. Wegner, Y. Chen, S. Yea, "3D-HEVC Draft Text 6", JCT3V-J1001.

The invention claimed is:

1. A multi-view video decoder comprising
a video decoding core configured to decode a plurality of views from a data stream, the video decoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and
a residual prediction switch configured to
read a parameter set from the data stream, the parameter set relating to the second reference picture, and derive therefrom the set of all reference pictures that can be used for prediction of the second reference picture and are of the reference view;
check whether the third reference picture is comprised in the set of reference pictures;
depending on the check, if the third reference picture is comprised in the set of reference pictures, enable the residual prediction for the predetermined motion- or disparity-compensatedly predicted coding unit at least with respect to third reference picture; and
depending on the check, if the third reference picture is not comprised in the set of reference pictures, disable the residual prediction for the predetermined motion- or disparity-compensatedly predicted coding unit at least with respect to third reference picture,
wherein the video decoding core is configured to, depending on the residual prediction switch, apply or not apply residual prediction based on the third reference picture for the predetermined motion- or disparity-compensatedly predicted coding unit.

2. The multi-view video decoder according to claim 1 wherein the residual prediction switch is configured to perform the enabling and disabling depending on the check in a manner independent from the third reference picture being present or absent in a decoded picture buffer of the multi-view video decoder.

3. The multi-view video decoder according to claim 1, wherein the video decoding core is configured to determine a subset of reference pictures out the first, second and third reference pictures depending on the predetermined motion- or disparity-compensatedly predicted coding unit being a motion-compensatedly predicted coding unit or a disparity-compensatedly predicted coding unit and perform, if enabled by the residual prediction switch, the residual prediction of the predetermined motion- or disparity-compensatedly predicted coding unit using the determined subset of reference pictures.

4. The multi-view video decoder according to any of claims 1, wherein the video decoding core is configured to predict, if the residual prediction of the predetermined motion- or disparity-compensatedly predicted coding unit is enabled by the residual prediction switch, a prediction residual of the predetermined motion- or disparity-compensatedly predicted coding unit using
the second and third reference pictures f the predetermined motion- or disparity-compensatedly predicted coding unit is a motion-compensatedly predicted coding unit, and
the first and third reference pictures if the predetermined motion- or disparity-compensatedly predicted coding unit is a disparity-compensatedly predicted coding unit.

5. The multi-view video decoder according to claim 1, wherein the video decoding core is configured to
predict the predetermined motion- or disparity-compensatedly predicted coding unit using
one of a set of temporal reference pictures which comprises the first reference picture if the predetermined motion- or disparity-compensatedly predicted coding unit is a motion-compensatedly predicted coding unit, and
the second reference picture if the predetermined motion- or disparity-compensatedly predicted coding unit is a disparity-compensatedly predicted coding unit, and
predict, if the residual prediction of the predetermined motion- or disparity-compensatedly predicted coding unit is enabled by the residual prediction switch, a prediction residual of the prediction.

6. The multi-view video decoder according to claim 1, wherein the video decoding core is configured to
if the residual prediction of the predetermined motion- or disparity-compensatedly predicted coding unit is enabled by the residual prediction switch,
read a signalization from the data stream signaling whether the residual prediction is to be applied to the predetermined motion- or disparity-compensatedly predicted coding unit or not,
if the residual prediction of the predetermined motion- or disparity-compensatedly predicted coding unit is disabled by the residual prediction switch,
skip reading the signalization from the data stream, and
apply the residual prediction to the predetermined motion- or disparity-compensatedly predicted coding unit if the residual prediction of the predetermined motion- or disparity-compensatedly predicted coding unit is enabled by the residual prediction switch, and the signalization signals that the residual prediction is to be applied to the predetermined motion- or disparity-compensatedly predicted coding unit.

7. The multi-view video decoder according to claim 1, wherein the video decoding core is configured to read a signalization from the data stream signaling whether the residual prediction is to be applied to the predetermined motion- or disparity-compensatedly predicted coding unit or not, apply the residual prediction to the predetermined motion- or disparity-compensatedly predicted coding unit if the residual prediction of the predetermined motion- or disparity-compensatedly predicted coding unit is enabled by the residual prediction switch, and the signalization signals that the residual prediction is to be applied to the predetermined motion- or disparity-compensatedly predicted coding unit.

8. The multi-view video decoder according to claim 1, further configured to disable, irrespective of the residual prediction switch, the residual prediction of the predetermined motion- or disparity-compensatedly predicted coding unit of the current picture of the current view responsive to a flag or syntax elements in the data stream.

9. The multi-view video decoder according to claim 1, wherein residual prediction switch configured to enable and disable the residual prediction depending on the check with respect to the first, second and third reference pictures so that, depending on the check, a prediction residual of a first stage motion- or disparity-compensated prediction of the predetermined motion- or disparity-compensatedly predicted coding unit is decoded from the data stream unpredictively or predictively.

10. The multi-view video decoder according to claim 1, wherein the residual prediction switch configured to perform the reading, checking, enabling and disabling per hypothesis if the current picture is multi-hypothesis predicted picture.

11. The multi-view video decoder according to claim 1, configured to detect that the third reference picture is lost if the third reference picture is comprised in the set of reference pictures, but absent in a decoded picture buffer of the multi-view video decoder.

12. The multi-view video decoder according to claim 1, configured to detect that the third reference picture is lost and initiate an error resilience mode if the third reference picture is comprised in the set of reference pictures, but absent in a decoded picture buffer of the multi-view video decoder.

13. The multi-view video decoder according to claim 1, further configured to read from the data stream a further parameter set relating to the second reference picture, and derive from the further parameter set a facultative set of reference pictures of the reference view that are to be maintained in a decoded picture buffer of the multi-view video decoder for potential use in prediction of the pictures of the reference view subsequent to the second reference picture, and empty the decoded picture buffer of the multi-view video decoder in a manner so that pictures currently buffered in the decoded picture buffer and comprised in the facultative set of reference pictures, are maintained in the decoded picture buffer, wherein the residual prediction switch is configured to derive the set of all reference pictures that can be used for prediction of the second reference picture and are of the reference view, in a manner independent from the facultative set of reference pictures of the reference view.

14. A multi-view video encoder comprising a video encoding core configured to encode a plurality of views into a data stream, the video encoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and a residual prediction switch configured to insert a parameter set into the data stream which relates to the second reference picture and allows a derivation of a the set of all reference pictures that can be used for prediction of the second reference picture and are of the reference view;

check whether the third reference picture is comprised in the set of reference pictures;

depending on the check, if the third reference picture is comprised in the set of reference pictures, enable the residual prediction for the current predetermined motion- or disparity-compensatedly predicted coding unit at least with respect to third reference picture; and depending on the check, if the third reference picture is not comprised in the set of reference pictures, disable the residual prediction for the current predetermined motion- or disparity-compensatedly predicted coding unit at least with respect to third reference picture, wherein the video encoding core is configured to, depending on the residual prediction switch, apply or not apply residual prediction based on the third reference picture for the current predetermined motion- or disparity-compensatedly predicted coding unit.

15. The multi-view video encoder according to claim 14, wherein the residual prediction switch is configured to perform the enabling and disabling depending on the check in a manner independent from the third reference picture being present or absent in a decoded picture buffer of the multi-view video encoder.

16. The multi-view video encoder according to claim 14, wherein the video encoding core is configured to determine a subset of reference pictures out the first, second and third reference pictures depending on the predetermined motion- or disparity-compensatedly predicted coding unit being a motion-compensatedly predicted coding unit or a disparity-compensatedly predicted coding unit and perform, if enabled by the residual prediction switch, the residual prediction of the predetermined motion- or disparity-compensatedly predicted coding unit using the determined subset of reference pictures.

17. The multi-view video encoder according to claim 14, wherein the video encoding core is configured to perform, if enabled by the residual prediction switch, the residual prediction of the predetermined motion- or disparity-compensatedly predicted coding unit using the second and third reference pictures if the predetermined motion- or disparity-compensatedly predicted coding unit is a motion-compensatedly predicted coding unit, and the first and third reference pictures if the predetermined motion- or disparity-compensatedly predicted coding unit is a disparity-compensatedly predicted coding unit.

18. The multi-view video encoder according to claim 14, wherein the video encoding core is configured to
predict the predetermined motion- or disparity-compensatedly predicted coding unit using
the first reference picture if the predetermined motion- or disparity-compensatedly predicted coding unit is a motion-compensatedly predicted coding unit, and
the second reference picture if the predetermined motion- or disparity-compensatedly predicted coding unit is a disparity-compensatedly predicted coding unit, and
apply, if enabled by the residual prediction switch, the residual prediction of the predetermined motion- or disparity-compensatedly predicted coding unit to a prediction residual of the prediction.

19. The multi-view video encoder according to claim 14, wherein the video decoding core is configured to
if the residual prediction of the predetermined motion- or disparity-compensatedly predicted coding unit is enabled by the residual prediction switch,
insert a signalization into the data stream signaling whether the residual prediction is to be applied to the predetermined motion- or disparity-compensatedly predicted coding unit or not,
if the residual prediction of the predetermined motion- or disparity-compensatedly predicted coding unit is disabled by the residual prediction switch,
skip inserting the signalization into the data stream, and
apply the residual prediction to the predetermined motion- or disparity-compensatedly predicted coding unit if
the residual prediction of the predetermined motion- or disparity-compensatedly predicted coding unit is enabled by the residual prediction switch, and
the signalization signals that the residual prediction is to be applied to the predetermined motion- or disparity-compensatedly predicted coding unit.

20. The multi-view video encoder according to claim 14, wherein the video decoding core is configured to
insert a signalization into the data stream signaling whether the residual prediction is to be applied to the predetermined motion- or disparity-compensatedly predicted coding unit or not,
apply the residual prediction to the predetermined motion- or disparity-compensatedly predicted coding unit if
the residual prediction of the predetermined motion- or disparity-compensatedly predicted coding unit is enabled by the residual prediction switch, and
the signalization signals that the residual prediction is to be applied to the predetermined motion- or disparity-compensatedly predicted coding unit.

21. The multi-view video encoder according to claim 14, further configured to disable, irrespective of the residual prediction switch, the residual prediction of a predetermined motion- or disparity-compensatedly predicted coding unit of the current picture of the current view responsive to a flag or syntax elements in the data stream.

22. The multi-view video encoder according to claim 14, wherein residual prediction switch is configured to enable and disable the residual prediction depending on the check with respect to the first, second and third reference pictures so that, depending on the check, a prediction residual of a first stage motion- or disparity-compensated prediction of the predetermined motion- or disparity-compensatedly predicted coding unit is coded into the data stream un-predictively or predictively.

23. The multi-view video encoder according to claim 14, wherein the residual prediction switch configured to perform the inserting, checking, enabling and disabling per hypothesis if the current picture is multi-hypothesis predicted picture.

24. A method for multi-view video decoding, comprising
decoding, performed by a video decoding core, a plurality of views from a data stream, the video decoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture,
reading a parameter set from the data stream, the parameter set relating to the second reference picture, and deriving therefrom the set of all reference pictures that can be used for prediction of the second reference picture and are of the reference view;
checking whether the third reference picture is comprised in the set of reference pictures;
depending on the check, if the third reference picture is comprised in the set of reference pictures, enabling the residual prediction for the current coding unit at least with respect to third reference picture; and
depending on the check, if the third reference picture is not comprised in the set of reference pictures, disabling the residual prediction for the current coding unit at least with respect to third reference picture,
so that, depending on the check, the video decoding core applies or not applies disparity-compensated residual prediction based on the third reference picture for the current coding unit.

25. A method for multi-view video encoding, comprising
Encoding, performed by a video encoding core, a plurality of views into a data stream, the video encoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and
inserting a parameter set into in the data stream which relates to the second reference picture and allows for a derivation of the set of all reference pictures that can be used for prediction of the second reference picture and are of the reference view;
checking whether the third reference picture is comprised in the set of reference pictures;
depending on the check, if the third reference picture is comprised in the set of reference pictures, enabling the residual prediction for the current coding unit at least with respect to third reference picture; and
depending on the check, if the third reference picture is not comprised in the set of reference pictures, disabling the residual prediction for the current coding unit at least with respect to third reference picture,
so that the video encoding core, depending on the disparity-compensated residual prediction switch, applies or not applies disparity-compensated residual prediction based on the third reference picture for the current coding unit.

26. A non-transitory digital storage medium having a computer program stored thereon to perform the method for multi-view decoding, comprising:

decoding, performed by a video decoding core, a plurality of views from a data stream, the video decoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, reading a parameter set from the data stream, the parameter set relating to the second reference picture, and deriving therefrom the set of all reference pictures that can be used for prediction of the second reference picture and are of the reference view;

checking whether the third reference picture is comprised in the set of reference pictures; depending on the check, if the third reference picture is comprised in the set of reference pictures, enabling the residual prediction for the current coding unit at least with respect to third reference picture; and depending on the check, if the third reference picture is not comprised in the set of reference pictures, disabling the residual prediction for the current coding unit at least with respect to third reference picture, so that, depending on the check, the video decoding core applies or not applies disparity-compensated residual prediction based on the third reference picture for the current coding unit, when said computer program is run by a computer.

27. A non-transitory digital storage medium having a computer program stored thereon to perform the method for method for multi-view video encoding, comprising:

encoding, performed by a video encoding core, a plurality of views into a data stream, the video encoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and inserting a parameter set into in the data stream which relates to the second reference picture and allows for a derivation of the set of all reference pictures that can be used for prediction of the second reference picture and are of the reference view;

checking whether the third reference picture is comprised in the set of reference pictures; depending on the check, if the third reference picture is comprised in the set of reference pictures, enabling the residual prediction for the current coding unit at least with respect to third reference picture; and depending on the check, if the third reference picture is not comprised in the set of reference pictures, disabling the residual prediction for the current coding unit at least with respect to third reference picture, so that the video encoding core, depending on the disparity-compensated residual prediction switch, applies or not applies disparity-compensated residual prediction based on the third reference picture for the current coding unit, when said computer program is run by a computer.

28. A digital storage medium having stored thereon a data stream generated by a method for multi-view video encoding, comprising:

encoding, performed by a video encoding core, a plurality of views into a data stream, the video encoding core supporting residual prediction of a predetermined motion- or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, and inserting a parameter set into in the data stream which relates to the second reference picture and allows for a derivation of the set of all reference pictures that can be used for prediction of the second reference picture and are of the reference view;

checking whether the third reference picture is comprised in the set of reference pictures;

depending on the check, if the third reference picture is comprised in the set of reference pictures, enabling the residual prediction for the current coding unit at least with respect to third reference picture; and depending on the check, if the third reference picture is not comprised in the set of reference pictures, disabling the residual prediction for the current coding unit at least with respect to third reference picture, so that the video encoding core, depending on the disparity-compensated residual prediction switch, applies or not applies disparity-compensated residual prediction based on the third reference picture for the current coding unit.

29. A multi-view video decoder comprising a video decoding core configured to decode a plurality of views from a data stream, the video decoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, a residual prediction switch configured to read a first parameter set from the data stream, the first parameter set relating to the current picture, and derive therefrom a first set of reference pictures comprised in a view different from the current view and potentially serving as the second reference picture for coding units of the current picture and a reference timestamp of a reference picture which potentially serves as the first reference picture for coding units of the current picture;

for each of a second set of reference pictures comprising one picture for each reference picture of the first set which coincides in view with the respective reference picture of the first set of reference pictures, and is of the reference timestamp, read a flag from a second parameter set within the data stream, relating to the current picture, the flag indicating whether the respective picture of the second set of reference pictures is available as third reference picture for residual prediction;

wherein the video decoding core is configured to, depending on the flag related to a predetermined reference picture out of the second set of pictures, apply or not apply residual prediction for the predetermined motion or disparity-compensatedly predicted coding unit using the respective picture of the second set of pictures as the third reference picture.

30. A multi-view video encoder comprising
a video decoding core configured to encode a plurality of views into a data stream, the video encoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture,
a residual prediction switch configured to
    insert, into a first parameter set comprised by the data stream, a parameter set relating to the current picture based on which
        a first set of reference pictures comprised in a view different from the current view and potentially serving as the second reference picture for coding units of the current picture and
        a reference timestamp of a reference picture which potentially serves as the first reference picture for coding units of the current picture are derivable;
    for each of a second set of reference pictures comprising one picture for each reference picture of the first set which coincides in view with the respective reference picture of the first set of reference pictures, and is of the reference timestamp, insert a flag in a second parameter set into the data stream, relating to the current picture, the flag indicating whether the respective picture of the second set of reference pictures is available as third reference picture for residual prediction;
wherein the video encoding core is configured to, depending on the availability of a predetermined reference picture out of the second set of pictures as indicated by the flags in the second parameter set, apply or not apply residual prediction for the predetermined motion or disparity-compensatedly predicted coding unit using the respective picture of the second set of pictures as the third reference picture.

31. A method for multi-view video decoder, comprising
Decoding, performed by a video decoding core, a plurality of views from a data stream, the video decoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture,
reading a first parameter set from the data stream, the parameter set relating to the current picture, and deriving therefrom
    a first set of reference pictures comprised in a view different from the current view and potentially serving as the second reference picture for coding units of the current picture and
    a reference timestamp of a reference picture which potentially serves as the first reference picture for coding units of the current picture;
for each of a second set of reference pictures comprising one picture for each reference picture of the first set which coincides in view with the respective reference picture of the first set of reference pictures, and is of the reference timestamp, reading a flag from a second parameter set within the data stream, relating to the current picture, the flag indicating whether the respective picture of the second set of pictures is available as third picture for residual prediction;
wherein the video decoding core, depending on the flag related to a predetermined reference picture out of the second set of pictures, applies or not applies residual prediction for the predetermined motion or disparity-compensatedly predicted coding unit using the respective picture of the second set of reference pictures as the third reference picture.

32. A method for multi-view video encoding comprising
Encoding, performed by a video encoding core, a plurality of views into a data stream, the video encoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture,
inserting, into a first parameter set comprised by the data stream, a parameter set relating to the current picture based on which
    a first set of reference pictures comprised in a view different from the current view and potentially serving as the second reference picture for coding units of the current picture and
    a reference timestamp of a reference picture which potentially serves as the first reference picture for coding units of the current picture is derivable;
for each of a second set of reference pictures comprising one picture for each reference picture of the first set which coincides in view with the respective reference picture of the first set of reference pictures, and is of the reference timestamp, inserting a flag in a second parameter set into the data stream, relating to the current picture, the flag indicating whether the respective picture of the second set of pictures is available as third picture for residual prediction;
wherein the video encoding core, depending on the availability of a predetermined reference picture out of the second set of pictures as indicated by the flags in the second parameter set, applies or not applies residual prediction for the predetermined motion or disparity-compensatedly predicted coding unit using the respective picture of the second set of reference pictures as the third reference picture.

33. A non-transitory digital storage medium having a computer program stored thereon to perform the method for multi-view video decoding, comprising:
decoding, performed by a video decoding core, a plurality of views from a data stream, the video decoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, reading a first parameter set from the data stream, the parameter set relating to the current picture, and deriving therefrom a first set of reference pictures comprised in a view different from the current view and potentially serving as the second reference picture for coding units of the current picture and a reference timestamp of a reference picture which potentially serves as the first reference picture for coding units of the current picture;

for each of a second set of reference pictures comprising one picture for each reference picture of the first set which coincides in view with the respective reference picture of the first set of reference pictures, and is of the reference timestamp, reading a flag from a second parameter set within the data stream, relating to the current picture, the flag indicating whether the respective picture of the second set of pictures is available as third picture for residual prediction;

wherein the video decoding core, depending on the flag related to a predetermined reference picture out of the second set of pictures, applies or not applies residual prediction for the predetermined motion or disparity-compensatedly predicted coding unit using the respective picture of the second set of reference pictures as the third reference picture, when said computer program is run by a computer.

34. A non-transitory digital storage medium having a computer program stored thereon to perform the method for multi-view video encoding comprising:

encoding, performed by a video encoding core, a plurality of views into a data stream, the video encoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, inserting, into a first parameter set comprised by the data stream, a parameter set relating to the current picture based on which a first set of reference pictures comprised in a view different from the current view and potentially serving as the second reference picture for coding units of the current picture and a reference timestamp of a reference picture which potentially serves as the first reference picture for coding units of the current picture is derivable;

for each of a second set of reference pictures comprising one picture for each reference picture of the first set which coincides in view with the respective reference picture of the first set of reference pictures, and is of the reference timestamp, inserting a flag in a second parameter set into the data stream, relating to the current picture, the flag indicating whether the respective picture of the second set of pictures is available as third picture for residual prediction;

wherein the video encoding core, depending on the availability of a predetermined reference picture out of the second set of pictures as indicated by the flags in the second parameter set, applies or not applies residual prediction for the predetermined motion or disparity-compensatedly predicted coding unit using the respective picture of the second set of reference pictures as the third reference picture, when said computer program is run by a computer.

35. A digital storage medium having stored thereon a data stream generated by a method for multi-view video encoding, comprising:

encoding, performed by a video encoding core, a plurality of views into a data stream, the video encoding core supporting residual prediction of a predetermined motion or disparity-compensatedly predicted coding unit of a current picture of a current view on the basis of a first reference picture of the current view, a second reference picture of a reference view, coinciding in timestamp with the current picture, and a third reference picture of the reference view, coinciding in timestamp with the first reference picture, inserting, into a first parameter set comprised by the data stream, a parameter set relating to the current picture based on which a first set of reference pictures comprised in a view different from the current view and potentially serving as the second reference picture for coding units of the current picture and a reference timestamp of a reference picture which potentially serves as the first reference picture for coding units of the current picture is derivable;

for each of a second set of reference pictures comprising one picture for each reference picture of the first set which coincides in view with the respective reference picture of the first set of reference pictures, and is of the reference timestamp, inserting a flag in a second parameter set into the data stream, relating to the current picture, the flag indicating whether the respective picture of the second set of pictures is available as third picture for residual prediction;

wherein the video encoding core, depending on the availability of a predetermined reference picture out of the second set of pictures as indicated by the flags in the second parameter set, applies or not applies residual prediction for the predetermined motion or disparity-compensatedly predicted coding unit using the respective picture of the second set of reference pictures as the third reference picture.

* * * * *